United States Patent
Lee et al.

(10) Patent No.: US 10,579,201 B2
(45) Date of Patent: *Mar. 3, 2020

(54) MOBILE TERMINAL, IMAGE DISPLAY DEVICE AND USER INTERFACE PROVISION METHOD USING THE SAME

(71) Applicant: LG ELECTRONICS INC., Seoul (KR)

(72) Inventors: Kwontae Lee, Pyeongtaek-si (KR); Youngkeun Kim, Pyeongtaek-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/358,132

(22) Filed: Mar. 19, 2019

(65) Prior Publication Data

US 2019/0212848 A1 Jul. 11, 2019

Related U.S. Application Data

(63) Continuation of application No. 15/896,924, filed on Feb. 14, 2018, now Pat. No. 10,282,050, which is a (Continued)

(30) Foreign Application Priority Data

Jul. 6, 2012 (KR) ........................ 10-2012-0073677
Jul. 30, 2012 (KR) ........................ 10-2012-0082974

(51) Int. Cl.
*G06F 3/048* (2013.01)
*G06F 3/14* (2006.01)
(Continued)

(52) U.S. Cl.
CPC ............ *G06F 3/048* (2013.01); *G06F 1/1694* (2013.01); *G06F 3/038* (2013.01);
(Continued)

(58) Field of Classification Search
None
See application file for complete search history.

(56) References Cited

U.S. PATENT DOCUMENTS

2003/0122774 A1   7/2003   Harada
2004/0051719 A1   3/2004   Fukui et al.
(Continued)

FOREIGN PATENT DOCUMENTS

CN   101467133 A   6/2009

OTHER PUBLICATIONS

"Chapter 2: Running Programs," Windows XP: The Complete Reference: Running Programs, Feb. 27, 2010, 6 pages, XP055117652.
(Continued)

*Primary Examiner* — Nicholas J Lee
(74) *Attorney, Agent, or Firm* — Birch, Stewart, Kolasch & Birch, LLP

(57) ABSTRACT

A method for sharing data with a mobile terminal in an image display device, can include including receiving a broadcast signal including audio and video data, connecting to the mobile terminal via a wireless network interface, controlling the wireless network interface to transmit data to the mobile terminal wirelessly connected to the image display device, in which the transmitted data includes information for representing a screen posture direction of the image display device, controlling the wireless network interface to receive screen information from the mobile terminal wirelessly connected to the image display device, in which the screen information changes based on the information for representing the screen posture direction of the image display device and displaying a mirroring image based on the screen information received from the mobile terminal in a first region while displaying the video data included in the broadcast signal in a second region, in which the mirroring (Continued)

image corresponds to a current screen displayed on the mobile terminal, further the video data is received via a tuner while the screen information is received via the wireless network interface different from the tuner.

23 Claims, 31 Drawing Sheets

Related U.S. Application Data continuation of application No. 15/463,914, filed on Mar. 20, 2017, now Pat. No. 9,927,942, which is a continuation of application No. 13/895,800, filed on May 16, 2013, now Pat. No. 9,632,648.

(51) Int. Cl.
| | |
|---|---|
| *G06F 1/16* | (2006.01) |
| *G06F 3/038* | (2013.01) |
| *G06F 3/0481* | (2013.01) |
| *G06F 3/0484* | (2013.01) |
| *G09G 5/14* | (2006.01) |
| *H04N 5/262* | (2006.01) |
| *H04N 21/422* | (2011.01) |
| *H04N 5/44* | (2011.01) |
| *H04N 21/41* | (2011.01) |
| *H04N 21/414* | (2011.01) |
| *H04N 21/431* | (2011.01) |

(52) U.S. Cl.
CPC ...... *G06F 3/04817* (2013.01); *G06F 3/04842* (2013.01); *G06F 3/1454* (2013.01); *G09G 5/14* (2013.01); *H04N 5/2624* (2013.01); *H04N 5/4403* (2013.01); *H04N 21/4122* (2013.01); *H04N 21/4126* (2013.01); *H04N 21/41407* (2013.01); *H04N 21/42204* (2013.01); *H04N 21/42222* (2013.01); *H04N 21/4312* (2013.01); *G06F 2200/1637* (2013.01); *G06F 2203/0384* (2013.01); *G06F 2203/04803* (2013.01); *G09G 2340/0464* (2013.01); *G09G 2354/00* (2013.01); *G09G 2356/00* (2013.01); *G09G 2370/16* (2013.01); *G09G 2370/20* (2013.01); *H04N 2005/4428* (2013.01)

(56) References Cited

U.S. PATENT DOCUMENTS

| | | |
|---|---|---|
| 2006/0161871 A1 | 7/2006 | Hotelling et al. |
| 2008/0062122 A1 | 3/2008 | Rosenberg et al. |
| 2008/0172617 A1 | 7/2008 | Takeda et al. |
| 2010/0064260 A1 | 3/2010 | Amano |
| 2010/0162127 A1 | 6/2010 | Uchino |
| 2011/0007091 A1* | 1/2011 | Homma ............... G06F 3/1431 345/619 |
| 2011/0175930 A1 | 7/2011 | Hwang et al. |
| 2011/0199389 A1 | 8/2011 | Lu et al. |
| 2011/0244924 A1 | 10/2011 | Jung et al. |
| 2011/0249073 A1 | 10/2011 | Cranfill et al. |
| 2011/0316879 A1 | 12/2011 | Chikahisa et al. |
| 2012/0038678 A1 | 2/2012 | Hwang et al. |
| 2012/0113029 A1 | 5/2012 | Ye et al. |
| 2012/0307141 A1 | 12/2012 | Millet et al. |

OTHER PUBLICATIONS

"Introduction to MS Windows XP—Mouse, Desktop, Windows, Applications, Fire Handling," 2009 Centre for Educational Technology, University of Cape Town, Dec. 31, 2009, pp. 1-20, XP055117648.

"Touchscreen User Manual, ZYTOUCH® Driver Software Version 1.0.4 (USB) (for Windows®)," Apr. 30, 2012, pp. 1-38, XP055117654.

Dalgleish, "Create Single Click Desktop Icons," Contextures Blog Excel Tips and Tutorials, URL: http://blog.contextures.com/archives/2009/01/06/create-single-click-desktop-icons/, Jan. 6, 2009, pp. 1-5, XP055378194.

\* cited by examiner

FIG. 35
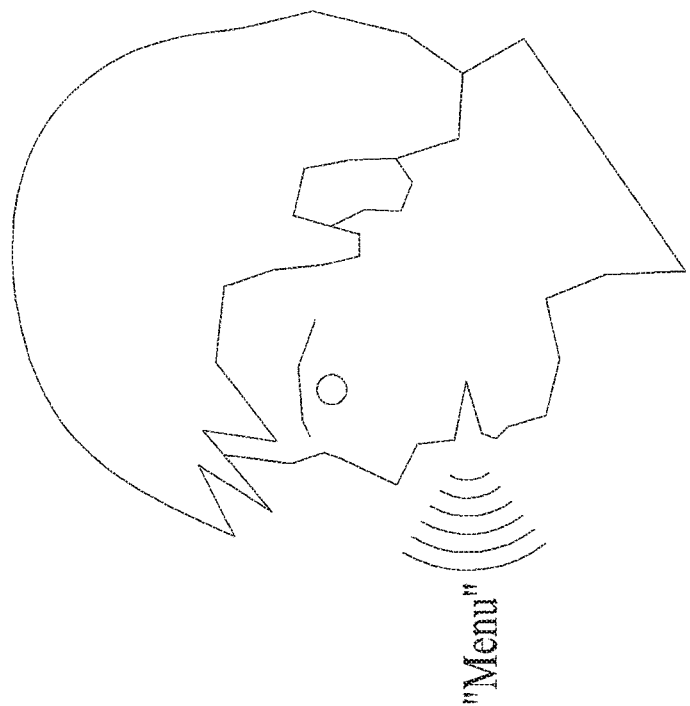
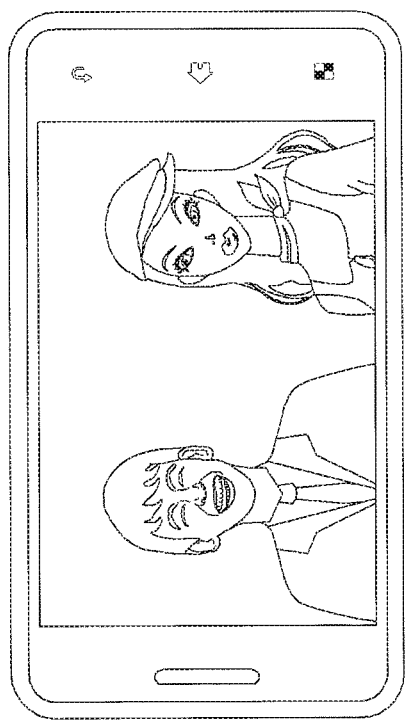

MOBILE TERMINAL, IMAGE DISPLAY DEVICE AND USER INTERFACE PROVISION METHOD USING THE SAME

CROSS-REFERENCE TO RELATED APPLICATIONS

This application is a Continuation of U.S. patent application Ser. No. 15/896,924, filed on Feb. 14, 2018, which is a Continuation of U.S. patent application Ser. No. 15/463,914, filed on Mar. 20, 2017 (now U.S. Pat. No. 9,927,942 issued on Mar. 27, 2018), which is a Continuation of U.S. patent application Ser. No. 13/895,800, filed on May 16, 2013 (now U.S. Pat. No. 9,632,648 issued on Apr. 25, 2017), which claims the benefit of Korean Patent Applications Nos. 10-2012-0073677, filed on Jul. 6, 2012, and 10-2012-0082974, filed on Jul. 30, 2012, all of which are hereby expressly incorporated into the present application.

BACKGROUND OF THE INVENTION

Field of the Invention

The present invention relates to a mobile terminal, an image display device and a user interface provision method using the same, and more particularly, to a mobile terminal, an image display device and a user interface provision method using the same, which are capable of displaying screens of various mobile devices on the image display device, allowing a user to control the mobile terminals via the screens of the mobile terminals output on the image display device, outputting the screens of the mobile terminals, and controlling the screens output on the image display device via the mobile terminals.

Discussion of the Related Art

Recently, with technological development, a mirroring service for sharing an image between two devices has been developed and has come into widespread use. The mirroring service is provided using a source device for providing image information and a sink device for outputting the received image information. Since the mirroring service conveniently allows a user to share the screens of the two devices by displaying the screen of the source device on the sink device, services associated therewith have been gradually increased.

Examples of the source device include a mobile device having a relatively small screen and configured to easily receive a user command and examples of the sink device include an image display device having a large screen.

Generally, the mirroring service is provided only using one source device and one sink device. That is, only the screen of one mobile terminal is displayed on one image display device. However, as user demands for various screens have been increased, there is a need for a multi-mirroring service for connecting various source devices to one sink device and displaying the screens of the various source devices on one sink device.

A multi-mirroring service includes a connected sink device and a multi user input back channel (UIBC) service provision method for controlling a sink device.

The related art mobile terminal is configured to receive a user command using a touch sensor. That is, the user touches a touch sensor of a mobile terminal to enter a user command. The related art mobile terminal does not display a pointing cursor corresponding to the touch input.

Accordingly, if the user manipulates the screen of the image display device which is the sink device via the mobile terminal which is the source device, the user manipulates the mobile terminal and then checks the image display device in order to check whether operation has been properly performed. That is, the user must perform the operation while frequently and alternately checking the mobile terminal and the image display device.

Accordingly, in the operation requiring considerable interaction between the source device and the sink device, the user has to inconveniently perform operations while frequently and alternately checking the mobile terminal and the image display device. This is troublesome to a user who desires to fix their eyes in one direction.

SUMMARY OF THE INVENTION

Accordingly, the present invention is directed to a mobile terminal, an image display device and a user interface provision method using the same that substantially obviate one or more problems due to limitations and disadvantages of the related art.

An object of the present invention is to provide a mobile terminal, an image display device and a user interface provision method using the same, which are capable of allowing a user to control mobile terminals via the screens of the mobile terminals output on the image display device and allowing the user to efficiently control the screens output on the image display device.

Another object of the present invention is to provide an image display device and a user interface using the same, which are capable of allowing a user to efficiently control mobile terminals via the screens of mobile terminals output on the image display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a user interface provision method using an image display device and at least one mobile terminal connected to each other for data communication includes generating and transmitting screen information of the mobile terminal to the image display device; outputting a mirroring screen which is the transmitted screen information of the mobile terminal in a first region of a display of the image display device; setting a second region corresponding to an adjacent region of the first region; outputting a cursor input through a user input unit of the image display device on the display of the image display device; establishing data communication between a mobile terminal corresponding to the first region adjacent to the second region and the image display device if the cursor is located in the second region; determining that the mobile terminal corresponding to the first region is a target mobile terminal to be controlled by a user if the cursor is located in the first region; and transmitting a user command input through the user input unit of the image display device to the target mobile terminal.

In another aspect of the present invention, an image display device connected to at least one mobile terminal for data communication includes a display unit configured to output an image; a communication unit configured to perform data communication with the mobile terminal; a user input unit configured to receive a user command from a user; and a controller configured to control the communication unit to receive screen information of the mobile terminal, to control the display to output a mirroring screen which is the received screen information of the mobile terminal in a first region of a display of the image display device, to control the display to set a second region corresponding to an adjacent region of the first region and to output a cursor input through a user input unit of the image display device on the display of the image display device, to control the communication unit to establish data communication with a mobile terminal corresponding to the first region adjacent to the second region and the image display device if the cursor is located in the second region, and to control the communication unit to determine that the mobile terminal corresponding to the first region is a target mobile terminal to be controlled by a user if the cursor is located in the first region and to transmit a user command input through the user input unit of the image display device to the target mobile terminal.

In another aspect of the present invention, a mobile terminal includes a display configured to output an image; a communication unit configured to perform data communication with an external image display device; a sensor unit including a first touch sensor for sensing a first user touch received from a user and a second touch sensor for sensing a second user touch; and a controller configured to control the display to output a guide image in a screen region in which the first user touch is input, to analyze and execute a user command corresponding to the second user touch, to generate screen information using an image output on the display, and to control the communication unit to transmit the generated screen information to the image display device.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 35 is a diagram illustrating a fourth embodiment of a user interface provision method for controlling the screen of an image display device of the present invention;

DETAILED DESCRIPTION OF THE INVENTION

Figure 1A:
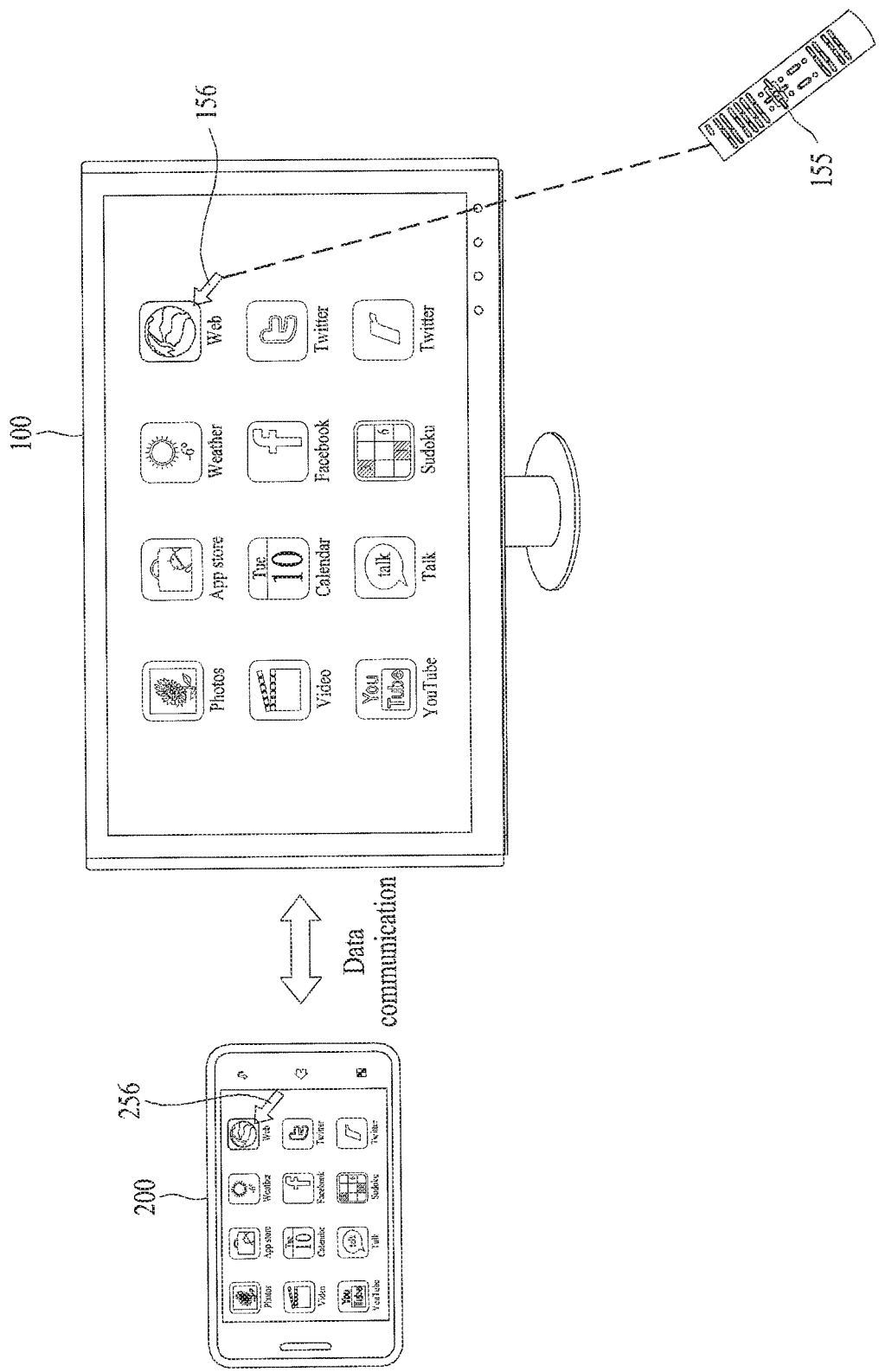
FIGS. 1A and 1B are diagrams showing a user interface provision environment using a mobile terminal and an image display device according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The words "module" and "unit", which are appended to terms describing components, are merely used for ease of explanation of the present invention and thus may be used interchangeably.

An image display device 100 described in the present specification may include all devices capable of displaying an image, such as a mobile phone, a smartphone, a personal digital assistants (PDA), a portable multimedia player (PMP), a TV receiver, a laptop computer, a digital broadcast terminal, a navigation device, etc.

A mobile device 200 described in the present specification may include all terminals connected to the image display device 100 to perform data communication, such as a mobile phone, a smartphone, a personal digital assistants (PDA), a portable multimedia player (PMP), etc.

FIG. 1 is a diagram showing a user interface provision environment using a mobile terminal 200 and an image display device 100 according to an embodiment of the present invention.

In the user interface provision environment of the present invention, the image display device 100 and the mobile terminal 200 are connected by wire or wirelessly to perform data communication. That is, the image display device 100 and the mobile terminal 200 are configured to transmit/receive data to/from another device connected thereto by wire or wirelessly.

In a method of connecting the image display device 100 and the mobile terminal 200, various technologies such as Ethernet, universal serial bus (USB), mobile high-definition (MHL), Wireless LAN (WLAN) (Wi-Fi), Wireless broadband (Wibro), Bluetooth, radio frequency identification (RFID), Infrared Data Association (IrDA), Ultra-WideB and (UWB), ZigBee, etc.

The image display device 100 and the mobile terminal 200 may share a screen through data communication. That is, the image display device 100 and the mobile terminal 200 receive and output screen information of the counterpart device. Thus, a user can receive the same screen using the two devices.

Sharing the screen between the two devices is referred to as a mirroring service. The mirroring service may be provided using a source device for providing screen information and a sink device for outputting the received screen information. That is, the mirroring service displays the screen of the source device on the sink device.

The source device encodes the screen information of the source device and transmits the encoded screen information to the sink device. The sink device decodes the received screen information and outputs the decoded screen information. At this time, the source device may request a decoding method supported by the sink device from the sink device and receive the decoding method.

In addition, the source device may transmit audio information of the source device to the sink device. The sink device outputs the received audio information via a speaker. In this case, the source device may separately transmit screen information and audio information or may multiplex screen information and audio information and transmit the multiplexed information.

In the present specification, the image display device 100 is the sink device and the mobile device 200 is the source device. Alternatively, the image display device 100 may be used as the source device and the mobile device 200 may be used as the sink device.

The image display device 100 and the mobile terminal 200 can transmit a user command input through data communication. That is, if the user enters a user command to the image display device 100 for displaying the screen of the mobile terminal 200, the image display device 100 transmits the user command to the mobile terminal 200 and the mobile terminal 200 performs operation of the mobile terminal 200 according to the received user command.

Accordingly, the user can control the mobile terminal 200 using the image display device 100. Controlling operation of the source device using the sink device is referred to as a user input back channel (UIBC) service.

In FIG. 1A, the image display device 100 and the mobile terminal 200 equally output an application icon screen which is the screen of the mobile terminal 200 through data communication. That is, the mobile terminal 200 transmits the screen information of the mobile terminal 200 to the image display device 100 through data communication and the image display device 100 displays the screen information of the mobile terminal 200.

The image display device 100 receives a user command from a user input unit 155 such as a wireless remote controller and transmits the received user command to the mobile terminal 200. That is, the user enters the user command to the image display device 100 to control the mobile terminal 200.

In addition, as shown in FIG. 1A, the image display device 100 and the mobile terminal 200 may display guide images 156 and 256 for displaying the input of the user command on the respective screens.

Figure 1B:
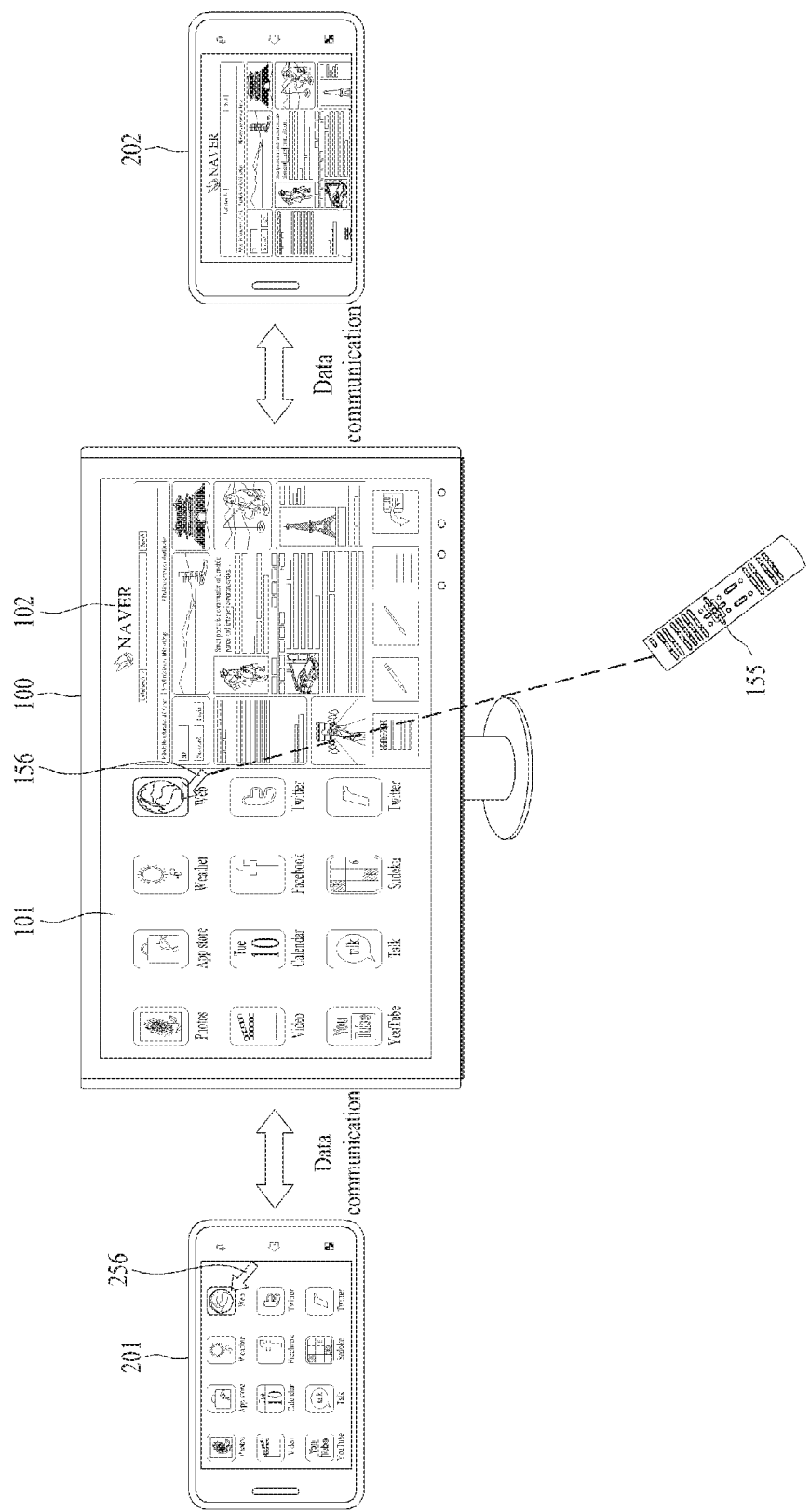

FIG. 1A shows one mobile terminal 200 connected to the image display device 100, and FIG. 1B shows two mobile terminals 201 and 202 connected to the image display device 100.

Referring to FIG. 1B, connecting several mobile terminals 201 and 202 to one image display device 100 and simultaneously displaying the screens of the mobile terminals 201 and 202 on the image display device 100 is referred to as a multi mirroring service. The user controlling several mobile terminals 201 and 202 through the image display device 100 is referred to as a multi UIBC service.

An object of a user interface of the present invention is to efficiently provide a multi mirroring service and a multi UIBC service to a user if several mobile terminals 201 and 202 are connected to the image display device 100.

In the present specification, prior to describing a user interface provision method using the image display device 100 and the mobile terminal 200, the configuration of the image display device 100 and the mobile terminal 200 will be described.

Figure 2:
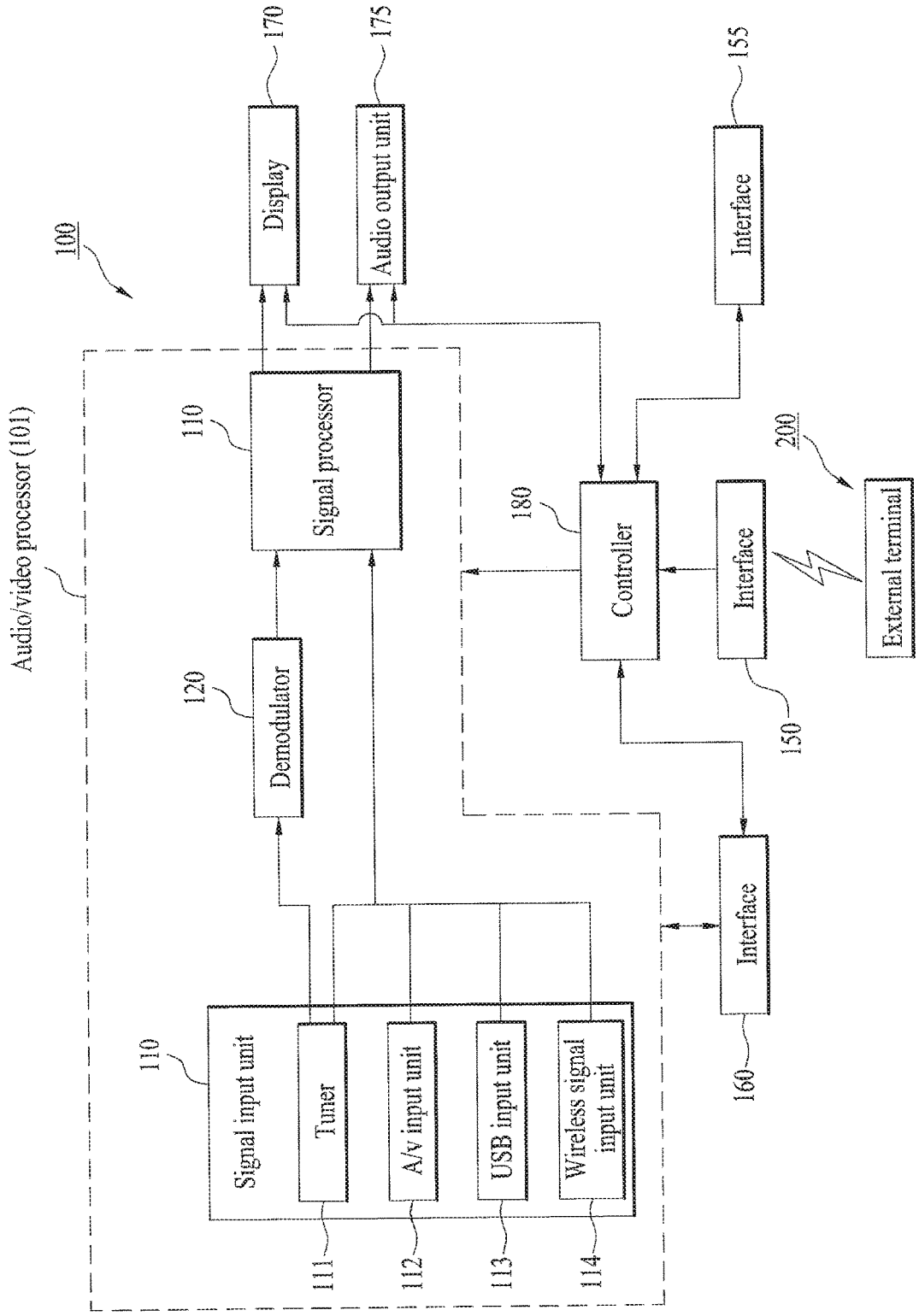
FIG. 2 is a block diagram showing the internal configuration of an image display device according to an embodiment of the present invention.

In particular, FIG. 2 is a block diagram showing the internal configuration of the image display device 100 according to an embodiment of the present invention.

Referring to FIG. 2, the image display device 100 includes an audio/video processor 101, an interface 150, a memory 160, a display 170, an audio output unit 175 and a controller 180.

Components shown in FIG. 2 are not essential and the image display device 100 having more components or fewer components may be implemented. Hereinafter, the above-described components will be sequentially described.

The audio/video processor 101 processes a video or audio signal such that video or audio is output through the display 170 or the audio output unit 175 of the image display device 100. For video or audio signal processing, the audio/video processor 101 may include a signal input unit 110, a demodulator 120 and a signal processor 140. In addition, the signal input unit 110 may include a tuner 111, an A/V input unit 112, a USB input unit 113 and a wireless signal input unit 114.

The tuner 111 tunes to a Radio Frequency (RF) broadcast signal corresponding to a channel selected by a user from among RF broadcast signals received through an antenna and converts the tuned RF broadcast into an Intermediate Frequency (IF) signal or an analog baseband Audio/Video (AV) signal. The analog baseband audio/video signal (CVBS (Composite Video Banking Sync) sound intermediate frequency (SIF)) output from the tuner 111 may be directly input to the signal processor 140.

The demodulator 120 receives the digital IF signal DIF from the tuner 110 and demodulates the digital IF signal DIF. The demodulator 120 may perform demodulation and channel decoding, thereby obtaining a stream signal TS. The stream signal output from the demodulator 120 may be input to the signal processor 140.

The signal processor 140 performs demultiplexing and signal processing, outputs the video signal to the display 170 and outputs the audio signal to the audio output unit 175.

In addition, the signal input unit 110 may connect an external device and the image display device 100. The signal input unit 110 is connected to an external device such as a digital versatile disc (DVD), a Blu-ray device, a game console, a camcorder or a computer (laptop) to transmit an external input video signal, an external input audio signal and an external input data signal to the signal processor 140 of the image display device 100. The video signal, audio signal and data signal processed by the image display device 100 may be output to another external device.

The A/V input unit 112 of the signal input unit 110 may include a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, a D-SUB port, an IEEE 1394 terminal, an SPDIF terminal, a liquid HD terminal, etc. in order to input the video and audio signals of the external device to the image display apparatus 100. The analog signal input via the CVBS s-terminal and the S-video terminal may be converted into a digital signal and the converted digital signal may be input to the signal processor 140. The digital signal input via another input terminal may be input to the signal processor 140 without analog/digital conversion.

The USB input unit 113 may receive the audio and video signal through a USB terminal.

The wireless signal input unit 114 may connect the image display device 100 to a wireless network. The image display device 100 may be connected to the wireless Internet through the wireless signal input unit 114. The wireless signal input unit 114 may perform short-range wireless communication with other electronic devices.

The signal input unit 110 may connect the image display device 100 to a set-top box. For example, if the set-top box is an internet protocol (IP) TV set-top box, the audio, video or data signal of the IPTV set-top box may be sent to the signal processor and signals processed by the signal processor 140 may be sent to the IPTV set-top box, for interactive communication. The IPTV may include an Internet TV and a full-browsing TV.

The signal processor 140 may demultiplex the received stream signal, e.g., MPEG-2 TS, into the video signal, the audio signal and the data signal. The signal processor 140 may perform video processing of the demultiplexed video signal. For example, if the demultiplexed video signal is an encoded video signal, the signal processor 140 may decode the encoded video signal. More specifically, if the demultiplexed video signal is an MPEG-2 encoded video signal, the MPEG-2 encoded video signal may be decoded by an MPEG-2 decoder.

The video signal processed by the signal processor 140 is displayed using the display 170. The signal processor may perform audio processing of the demultiplexed audio signal.

The signal processor 140 may perform on screen display (OSD) processing. More specifically, the signal processor 140 may output a variety of information on the screen of the display 170 in the form of graphic or text based on at least one of the processed video signal and the processed data signal and the signal input through the mobile terminal 200.

The memory 160 may store various applications necessary for the controller 180 to process and control signals, and may also store processed video, audio and data signals. The memory 180 may temporarily store a video, audio and/or data signal received from the signal input unit 110.

The memory 160 may include at least one of a flash memory, hard disk, multimedia card micro type or card type memory (e.g., an SD or XD memory, etc.), a RAM and a ROM. The image display device 100 may output a file (a moving image file, a still image file, a music file, a document, etc.) stored in the memory 160 back to provide the file to the user and executes an application stored in the memory 160 to provide the application to the user.

The controller 180 controls the overall operation of the image display device 100.

The controller 180 receives the screen information of the mobile terminal 200 from the mobile terminal 200 through the interface 150. The controller 180 controls the signal processor 140 to process the screen information of the mobile terminal and output the processed video signal to the display 170.

The controller 180 receives the user command for controlling the mobile terminal 200 from the user through the user input unit 155. The controller 180 may transmit data according to the received user command to the mobile terminal 200 through the interface 150.

The user input unit 155 may include a keyboard, a mouse, etc. connected to a wireless remote controller, a magic remote controller, and the image display device 100. In the present specification, assume that the user input unit 155 is a wireless remote controller.

Figure 3:
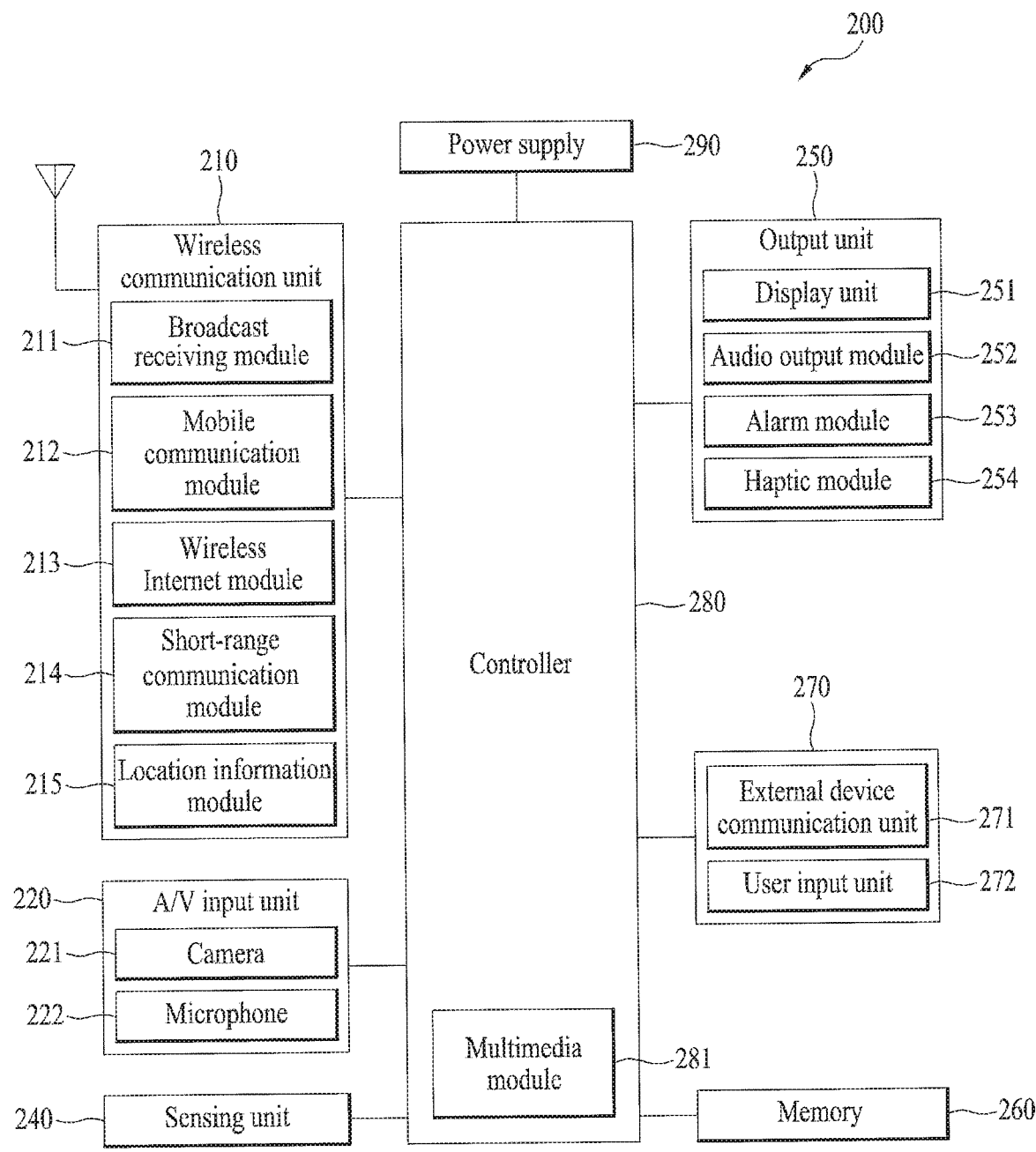
FIG. 3 is a block diagram showing the internal configuration of a mobile terminal according to an embodiment of the present invention.

FIG. 3 is a block diagram showing the internal configuration of the mobile terminal 200 according to an embodiment of the present invention.

Referring to FIG. 3, the mobile terminal 200 includes a wireless communication unit 210, an audio/video input unit 220, a sensing or sensor unit 240, an output unit 250, a memory 60, an interface 270, a controller 280 and a power supply 190.

Components shown in FIG. 3 are not essential and the mobile terminal 200 having more component or fewer components may be implemented. Hereinafter, the above-described components will be sequentially described.

The wireless communication unit 210 may include one or more modules for performing wireless communication between the mobile terminal 200 and a wireless communication system or between the mobile terminal 200 and a network in which the mobile terminal 200 is located. For example, the wireless communication unit 210 may include a broadcast reception module 211, a mobile communication module 212, a wireless Internet module 213, a short-range communication module 214 and a location information module 215.

The broadcast reception module 211 receives a broadcast signal and/or broadcast related information from an external broadcast management server via a broadcast channel. The broadcast channel may include a satellite channel and a terrestrial channel. The broadcast management server may generate and transmit a broadcast signal and/or broadcast related information or receive a previously generated broadcast signal and/or broadcast related information to the terminal. The broadcast signal may include a TV broadcast signal, a radio broadcast signal and a data broadcast signal and also include a combination of a TV broadcast signal or radio broadcast signal and a data broadcast signal.

There is a variety of broadcast related information. For example, the broadcast related information may take the form of an electronic program guide (EPG) of digital multimedia broadcasting (DMB) or an electronic service guide (ESG) of digital video broadcast-handheld (DVB-H). The broadcast signal and/or broadcast related information received through the broadcast reception module 211 may be stored in the memory 260.

The mobile communication module 212 transmits and receives a radio signal to and from at least one of a base station, an external terminal and a server over a mobile communication network. The radio signal may include a variety of data according to voice signal, video call signal or text/multimedia message transmission and reception.

The wireless Internet module 213 accesses the wireless Internet and may be mounted inside or outside the mobile terminal 200. For connection to wireless Internet, Wireless Local Area Network (WLAN) (i.e., Wi-Fi), Wireless Broadband (WiBro), World Interoperability for Microwave Access (WiMax), and High Speed Downlink Packet Access (HSDPA) may be used.

The short-range communication module 214 performs short-range communication. As short-range communication technologies, Bluetooth, radio frequency identification (RFID), infrared data association (IrDA), ultra wideband (UWB), ZigBee, NFC, etc. may be used.

The location information module 215 acquires the location of the mobile terminal and a representative example thereof includes a global positioning system (GPS) module.

Referring to FIG. 3, the A/V input unit 220 receives an audio signal or a video signal and may include a camera 221 and a microphone 222. The camera 221 processes an image frame such as a still image or a moving image obtained by an image sensor in a video communication mode or a capture mode. The processed image frame may be displayed on the display 251.

The image frame processed by the camera 221 may be stored in the memory 260 or transmitted to an external device via the wireless communication unit 210. Two or more cameras 221 may be included according to use environment. The microphone 222 receives and converts an external sound signal in a communication mode, a recording mode or a voice recognition mode into electrical voice data. In the communication mode, the processed voice data may be converted into a form transmittable to a base station to be output. Various noise elimination algorithms for eliminating noise generated in a process of receiving an external sound signal may be implemented in the microphone 222.

The sensing unit 240 senses an opened/closed state of the mobile terminal 200, the position of the mobile terminal 200, contact or non-contact of a user, the orientation of the mobile terminal and acceleration/deceleration of the mobile terminal and generates a sensor signal for controlling operation of the mobile terminal 200. The sensing unit 240 may include a proximity sensor, a gravity sensor, a gyroscope sensor, etc.

The output unit 250 generates visual, audible or tactile output and may include a display 251, an audio output module 252, an alarm module 253, a haptic module 254, etc.

The display 251 displays (outputs) information processed by the mobile terminal 200. For example, if the mobile terminal is in a communication mode, a user interface (UI) or a graphical user interface (GUI) associated with communication is displayed. If the mobile terminal 200 is in a video communication mode or a capture mode, captured and/or received image, UI or GUI is displayed. In addition, screen information received from the external image display device 100 may be output.

The display 251 may include at least one of a liquid crystal display (LCD), a thin film transistor-liquid crystal display (TFT LCD), an organic light emitting diode (OLED), a flexible display and a 3-dimensional (3D) display.

The display 251 and a sensor (hereinafter, referred to as a "touch sensor") for sensing a touch operation have a layered structure (hereinafter, referred to as a "touchscreen"), the display 251 may functions as an input device and an output device. The touch sensor may include a touch film, a touch sheet, a touch pad, etc.

The touch sensor may be configured to convert pressure applied to a specific part of the display 251 or change in capacitance generated in a specific part of the display 251 into an electrical input signal. The touch sensor may be configured to detect a touch location and area and touch pressure.

If touch input to the touch sensor is present, a signal(s) corresponding thereto is sent to a touch controller. The touch controller processes the signal(s) and then transmits a touch signal corresponding thereto to the controller 280. The controller 280 determines which portion of the display 251 is touched and the controller 280 analyzes a user command according to the touch signal and controls the mobile terminal 200 according to the user command.

The touch sensor may be configured to recognize a variety of touch operations of a user. For example, the touch sensor may receive a user touch varying according to touch pressure.

In implementation of the touch sensor, the touch sensor may include one touch sensor for distinguishably recognizing weak touch pressure and strong touch pressure or include a first touch sensor for recognizing weak touch pressure and a second touch sensor for recognizing strong touch pressure.

The controller 280 may recognize the user command according to touch recognized by the first touch sensor or the second touch sensor. For example, the controller 280 may recognize a user command corresponding to touch recognized by the first touch sensor as a first user command and a user command corresponding to touch recognized by the second touch sensor as a second user command. The controller 280 controls the mobile terminal 200 according to the user command.

The audio output module 252 may output audio data received from the wireless communication unit 210 or stored in the memory 260 in a call signal mode, a communication mode, a recording mode, a voice recognition mode, a broadcast reception mode, etc. The audio output module 252 may output a sound signal associated with a function (e.g., call signal reception sound, message reception sound, etc.) performed by the mobile terminal 200. Such an audio output module 252 may include a receiver, a speaker, a buzzer, etc.

The alarm unit 253 outputs a signal notifying the user that an event has occurred in the mobile terminal 200. Examples of the event occurring in the mobile terminal 200 include call signal reception, message reception, key signal input, touch input, etc. The alarm unit 253 may output a signal notifying the user that an event has occurred in a form other than a video signal or an audio signal, e.g., through vibrations. The video signal or the audio signal may be output through the display 251 or the audio output module 252 and the display 251 and the audio output module 252 may serve as parts of the alarm unit 253.

The haptic module 254 generates a variety of tactile effects that the user can feel. A typical example of the tactile effect generated by the haptic module 254 is vibration. The strength and pattern of vibrations generated by the haptic module 254 may be controlled. For example, different vibrations may be synthesized and output or may be sequentially output.

The memory 260 may store a program for processing and control of the controller 280 and may temporarily store input or output data (for example, a phonebook, messages, audio, still images, and moving images). The memory 260 may store data about vibrations and sound of various patterns output upon touch input of the touchscreen.

The interface 270 includes an external communication unit 271 and a user input unit 272 and serves as an interface with all external devices connected to the mobile terminal 200.

The external device communication unit 271 may receive data from all external devices connected to the mobile terminal 200 or transmit data of the mobile terminal 200 to an external device.

The user input unit 272 may generate input data for enabling the user to control operation of the mobile terminal 200. The user input unit 272 may include a key pad, a dome switch, a jog wheel, a jog switch, etc. The user input unit 272 may include the above-described touch pad (static pressure/static electrical).

The controller 280 controls the overall operation of the mobile terminal 200. For example, the controller 280 performs control and processing associated with voice communication, data communication, video communication, and the like.

The power supply 290 receives external power or internal power and supplies power required for operation to each component under control of the controller 280.

The various embodiments described herein may be implemented in a recording medium readable by a computer or a computer-like device by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and other electrical units for performing functions. In some cases, the embodiments of the present invention may be implemented in the controller 180. In a software configuration, procedures and functions according to the embodiments of the present invention may be implemented in the form of software modules that perform one or more functions and operations described herein. Software code may be realized by a software application written in an appropriate programming language, stored in the memory 260, and executed by the controller 180.

Hereinafter, a user interface provision method using the image display device 100 and the mobile terminal 200 will be described.

Figure 4:
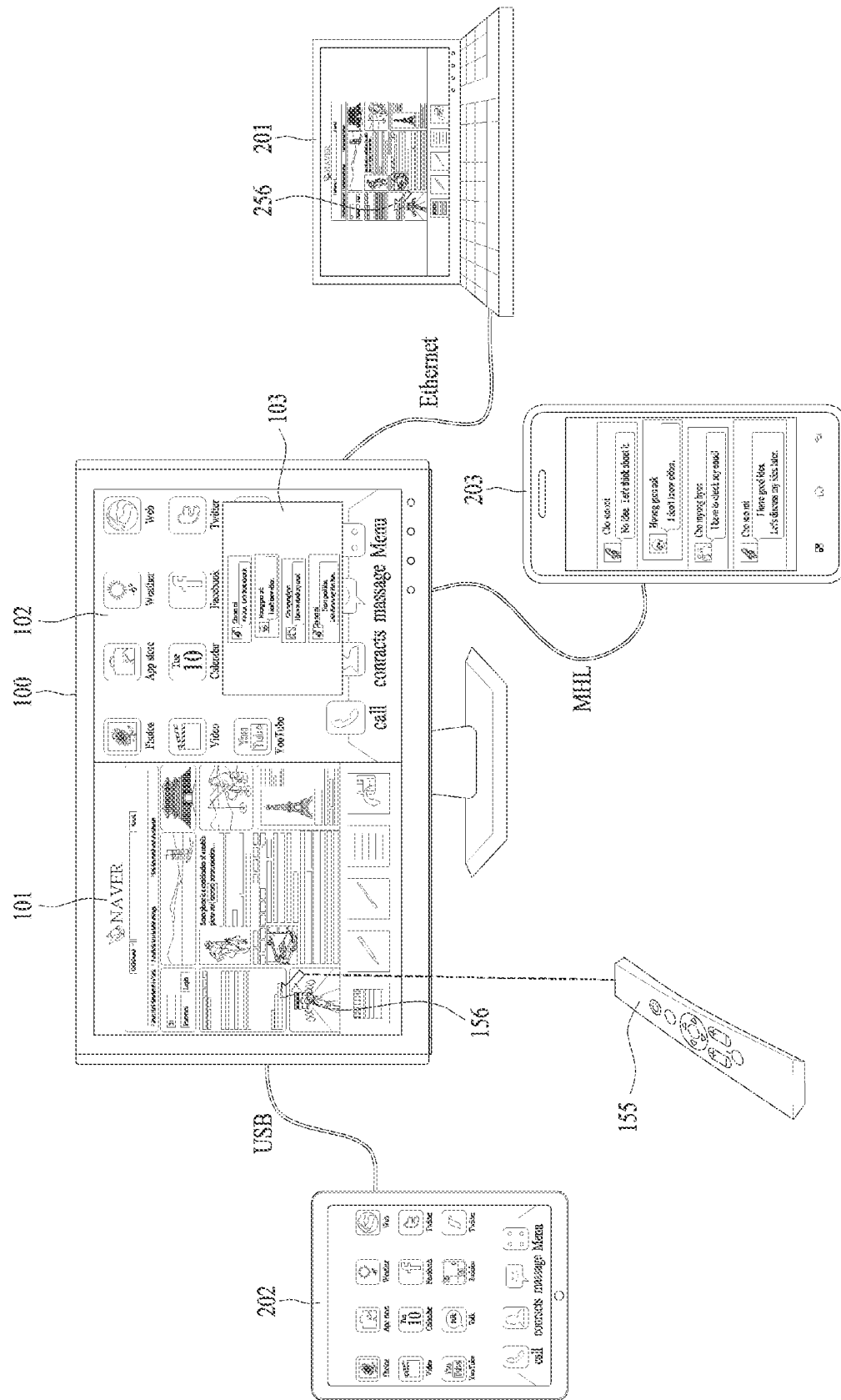
FIGS. 4 to 7 are diagrams illustrating a user interface provision method according to a first embodiment of the present invention.
Figure 5:
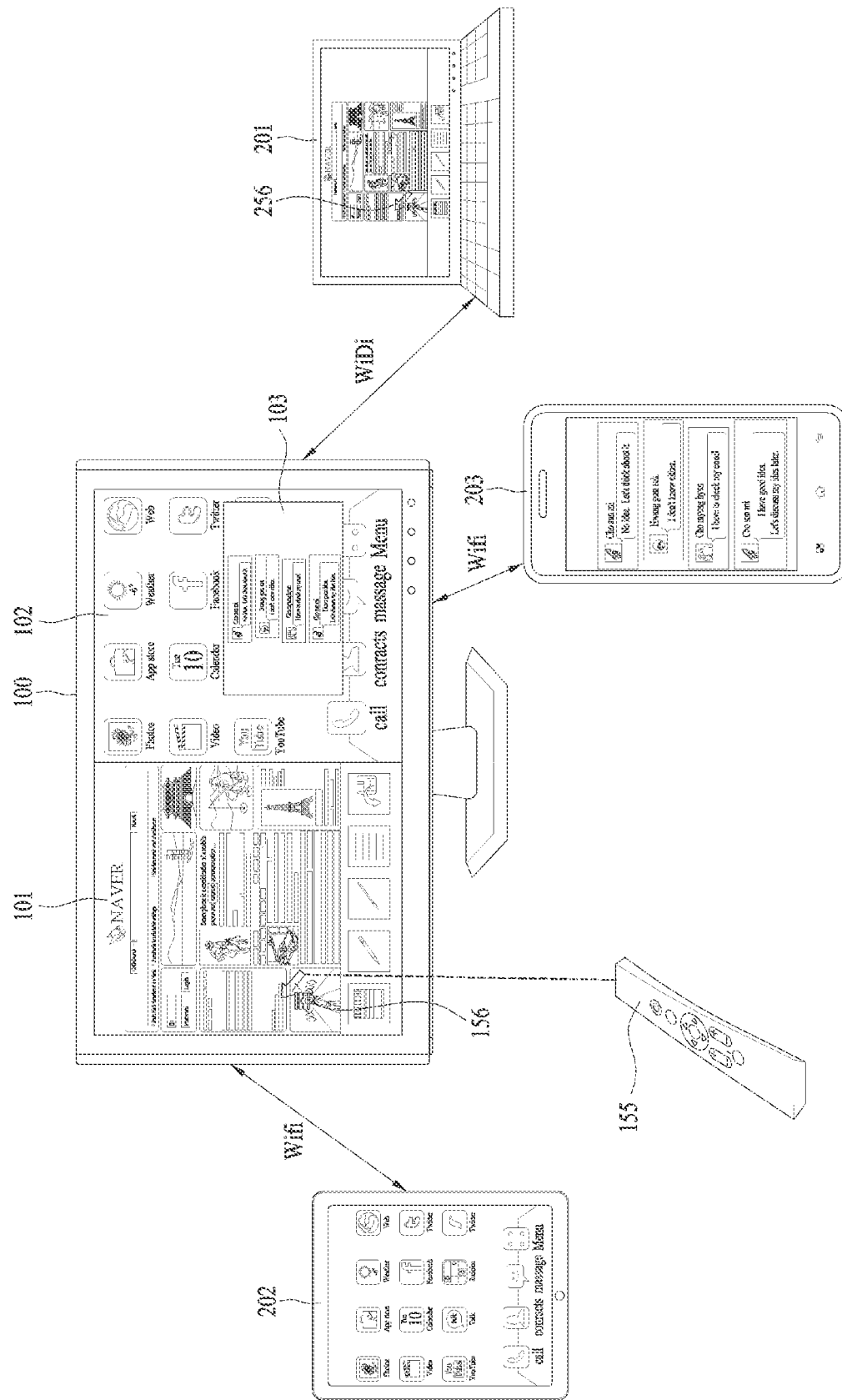
Figure 6:
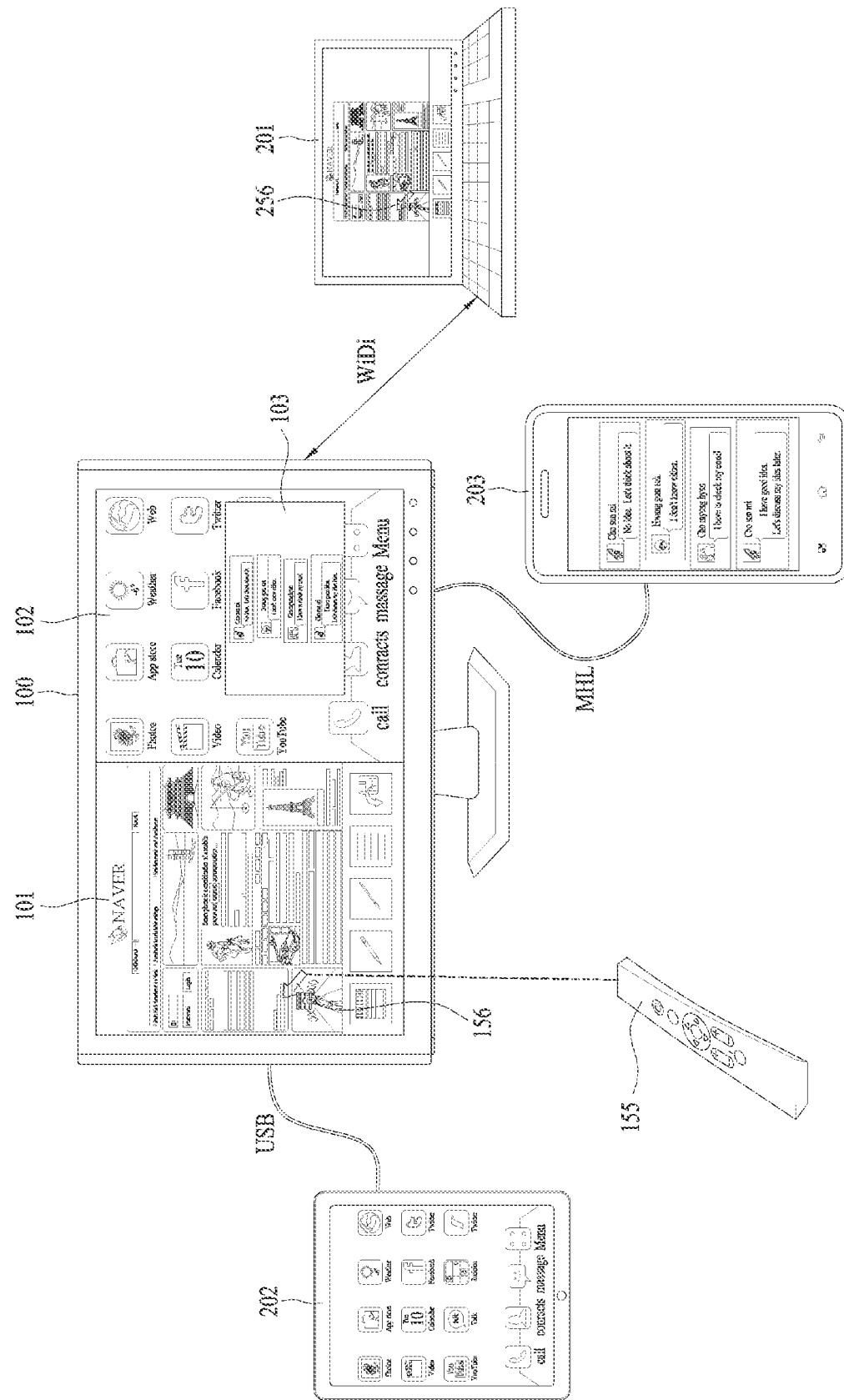

First, FIGS. 4 to 7 are diagrams illustrating a user interface provision method according to a first embodiment of the present invention. In particular, FIGS. 4 to 6 show a multi mirroring service for outputting three screens 101, 102 and 103 of three mobile terminals 201, 202 and 203 via the image display device 100 if the three mobile terminals 201, 202 and 203 are connected to the image display device 100.

That is, the three mobile terminals 201, 202 and 203 transmit respective screen information thereof to the image display device 100 and the image display device 100 processes and outputs the screen information of the mobile terminals 201, 202 and 203 on the display 170.

As shown in the figures, the image display device 100 outputs the screen of the first mobile terminal 201 as a first screen 101, the screen of the second mobile terminal 202 as a second screen 102 and the screen of the third mobile terminal 203 as a third screen 103.

FIG. 4 also shows the three mobile terminals 201, 202 and 203 are connected to the image display device 100 through wired technologies such as Ethernet, universal serial bus (USB) or mobile high-definition (MHL). FIG. 5 shows the three mobile terminals 201, 202 and 203 are connected to the image display device 100 through wireless technologies such as Wi-Fi or WiDi. FIG. 6 shows the three mobile terminals 201, 202 and 203 are connected to the image display device 100 through wired or wireless technologies such as USB, MHL or WiDi.

Accordingly, the mobile terminals 200 may be connected to the image display device 100 using various connection methods to transmit screen information thereof to the image display device 100. The image display device 100 outputs the received screen information on the display 170.

Figure 7:
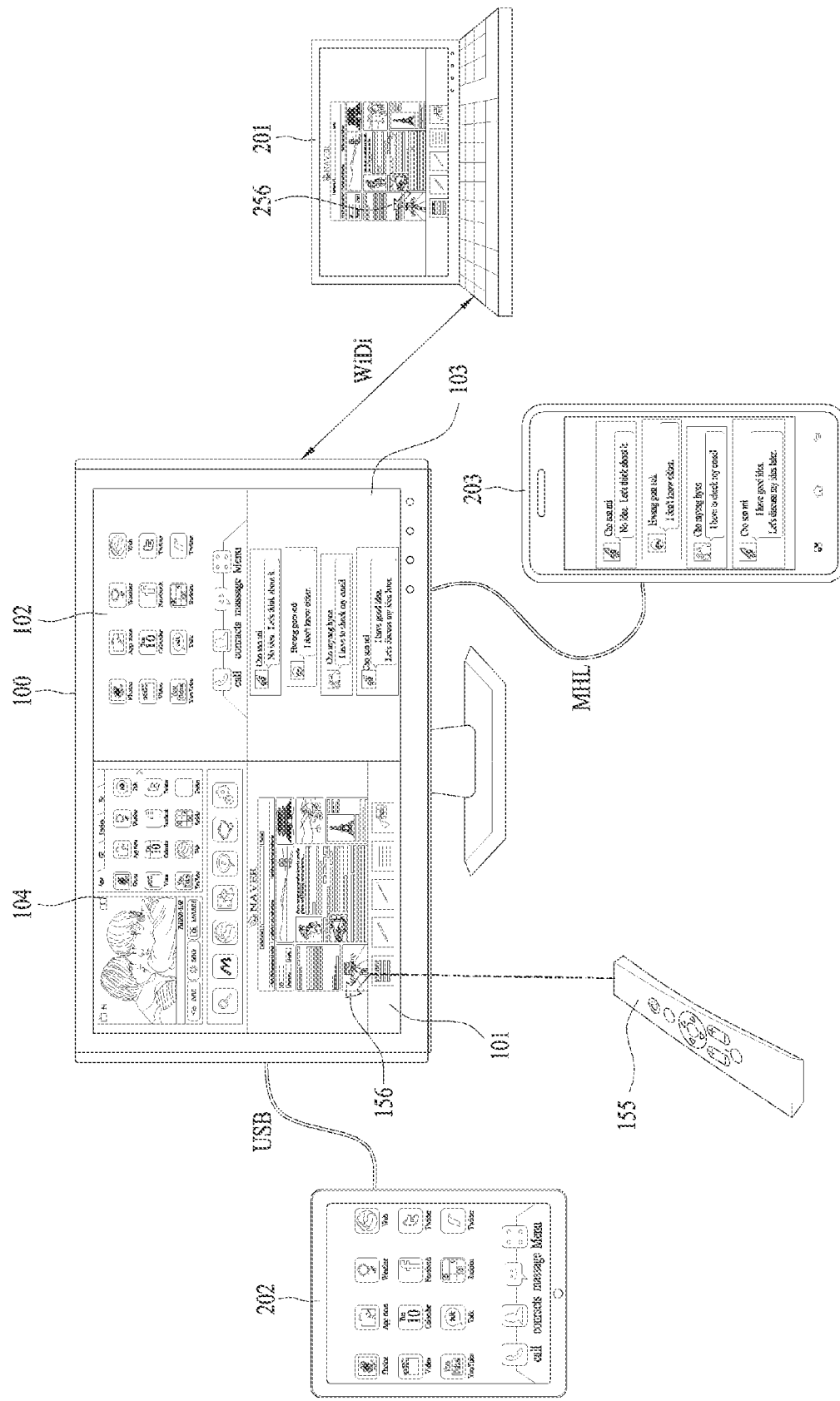

FIG. 7 shows a multi mirroring service for outputting three screens 101, 102 and 103 of three mobile terminals 201, 202 and 203 and an image 104 of the image display device 100 via the image display device 100 if the three mobile terminals 201, 202 and 203 are connected to the image display device 100.

As shown in FIG. 7, the image display device 100 outputs the screen of the first mobile terminal 201 as a first screen 101, the screen of the second mobile terminal 202 as a second screen 102, the screen of the third mobile terminal 203 as a third screen 103, and the image of the image display device 100 as a fourth screen 104.

As described above, a user command input to the image display device 100 may be transmitted to the mobile terminal 200 through data communication between the image display device 100 and the mobile terminal 200. That is, if the user enters a user command to the image display device 100 for outputting the screen of the mobile terminal 200, the image display device 100 transmits the received user command to the mobile terminal 200 and the mobile terminal 200 performs operation of the mobile terminal 200 according to the received user command.

As shown in the figure, if several mobile terminals 200 are connected to the image display device 100, the user can control the mobile terminal 200 via the screen of the mobile terminal 200 output on the image display device 100 using the user input unit 155.

That is, if the user enters a user command to the screen of the mobile terminal 200 to be controlled using the remote controller 155, the image display device 100 transmits data corresponding to the received user command to the mobile terminal 200.

Accordingly, the user can control the first mobile terminal 201 via the first screen 101, control the second mobile terminal 202 via the second screen 102, control the third mobile terminal 203 via the third screen 103, and control the image display device 100 via the fourth screen 104.

Accordingly, the image display device 100 determines on which screen the user enters a user command or which mobile terminal is controlled by the user. That is, the image display device 100 determines a target mobile terminal 200 which is desired to be controlled by the user. The image display device 100 transmits the received user command to the target mobile terminal 200 to be controlled by the user.

A method of determining the target mobile terminal 200 will be described in detail later with reference to FIGS. 11 to 13.

Figure 8:
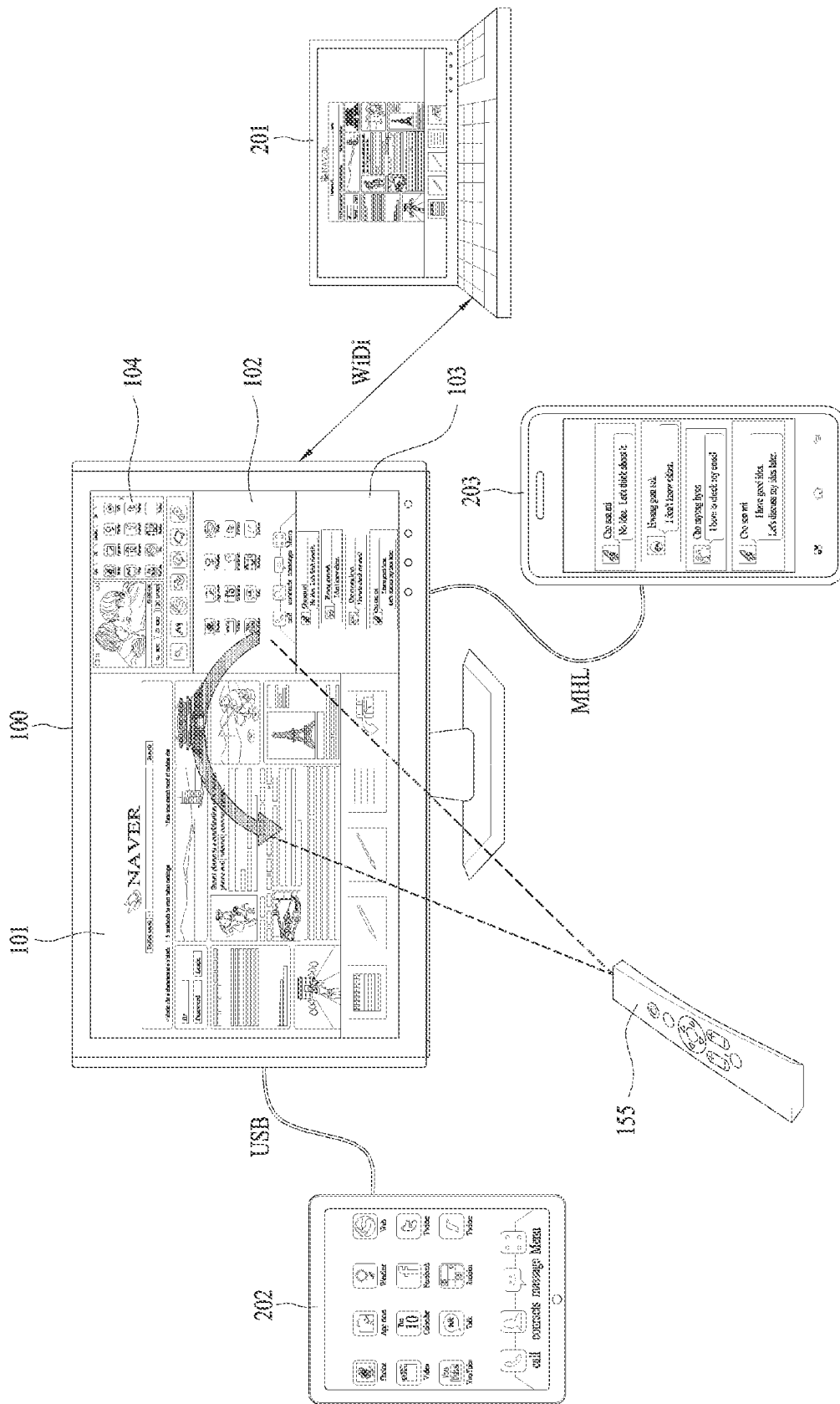
FIGS. 8 to 10 are diagrams illustrating a screen configuration method of an image display device for providing a multi-mirroring service according to an embodiment of the present invention.
Figure 9:
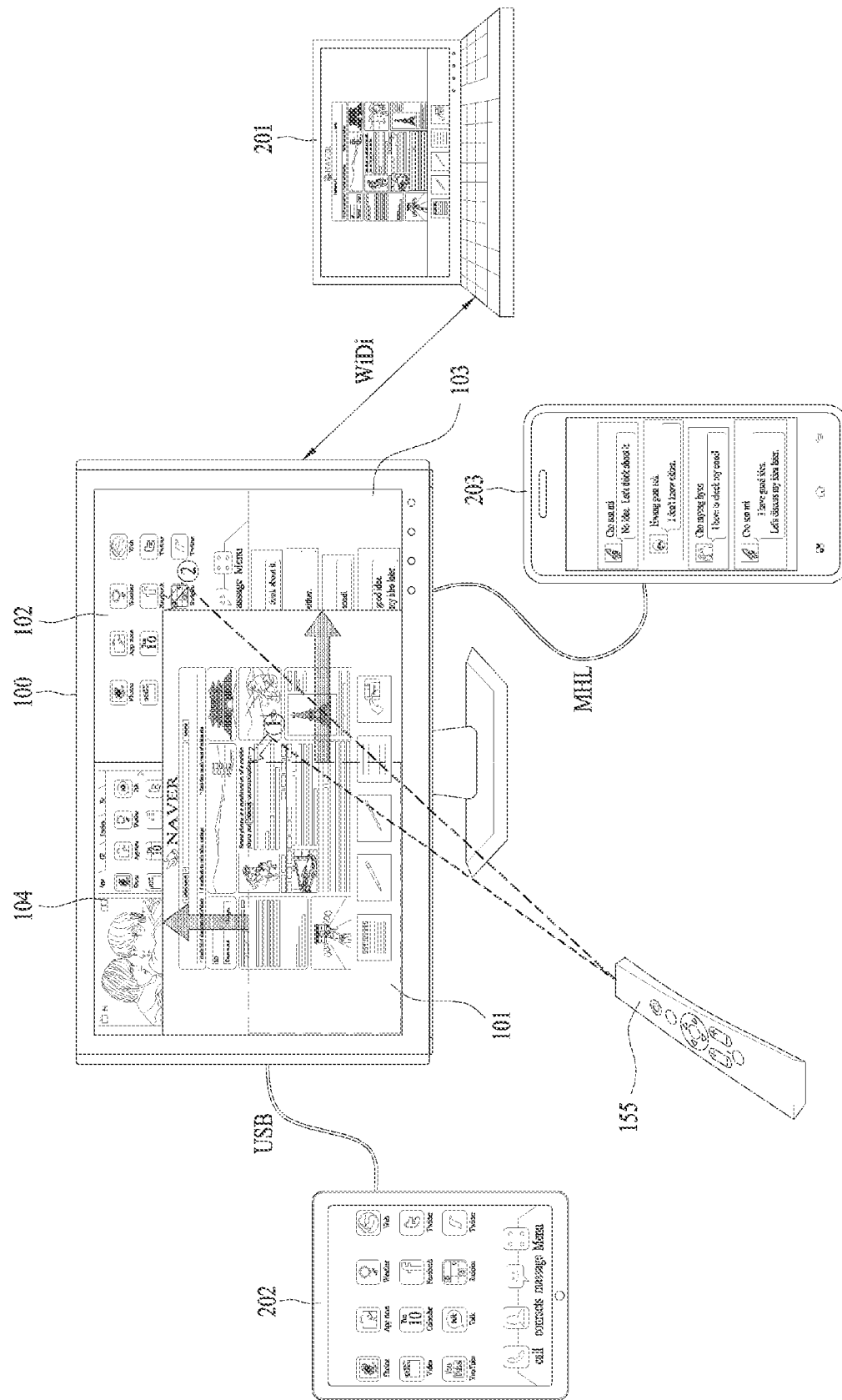
Figure 10:
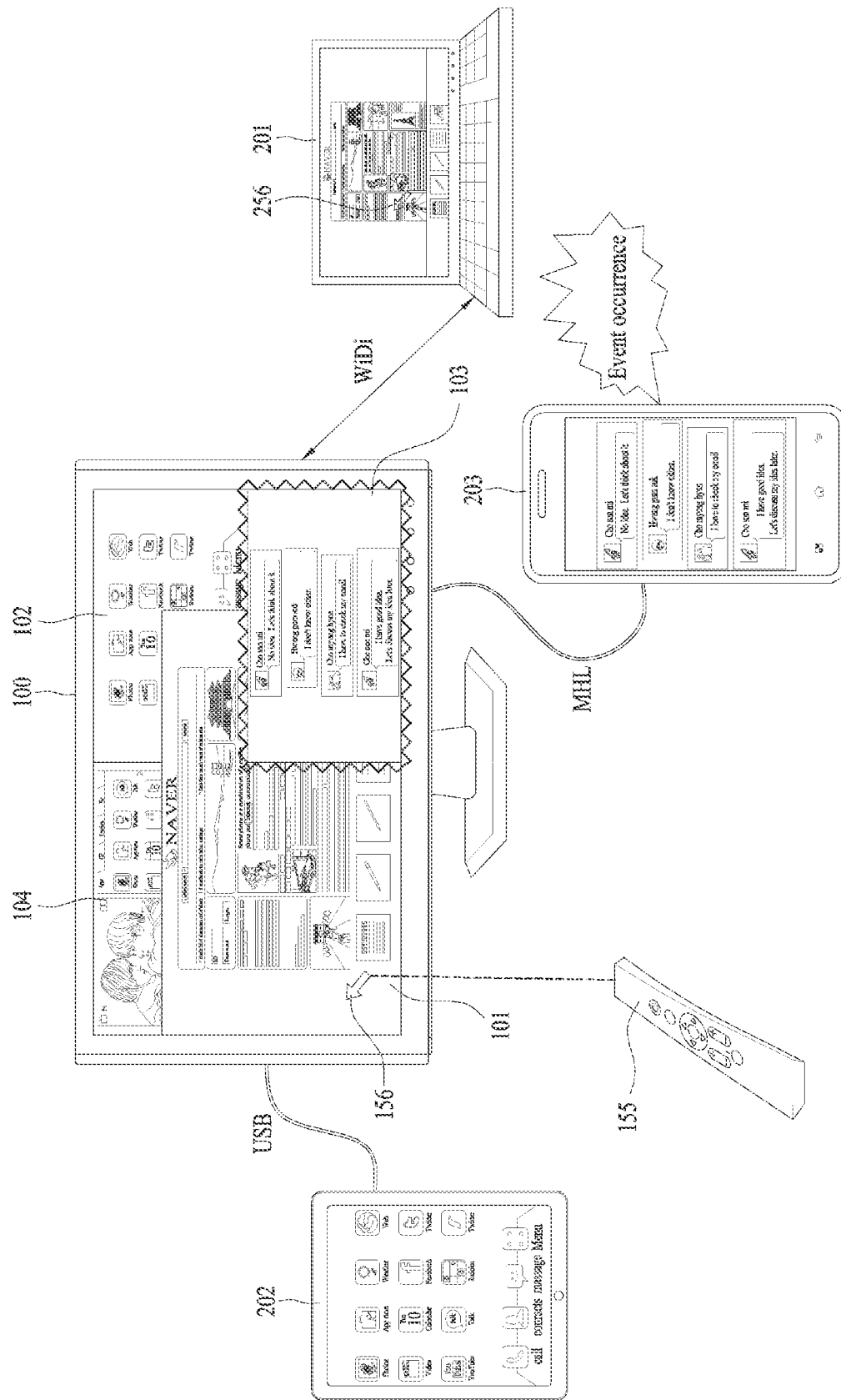

Next, FIGS. 8 to 10 are diagrams illustrating a screen configuration method of the image display device 100 for providing a multi-mirroring service according to an embodiment of the present invention.

In the above-described multi mirroring service, the screens of several mobile terminals 200 are output via the image display device 100. Accordingly, the image display device 100 arranges the screens of the mobile terminals 200 such that the user intuitively views the screens of the mobile terminals 200. Hereinafter, the method of arranging the screens of the mobile terminals 200 will be described.

First, the image display device 100 can arrange the screens of the mobile terminals 200 according to a predetermined scenario. That is, if two mobile terminals 200 are connected to the image display device 100, the screen of the image display device 100 may be split into right and left screens, the screen 101 of the first mobile terminal 201 may be output on the left screen, and the screen 102 of the second mobile terminal 202 may be output on the right screen.

If a new third mobile terminal 203 is further connected to the image display device 100, the image display device 100 may output the screen 103 of the third mobile terminal 203 in a picture-in-picture (PiP) format.

If a new fourth mobile terminal is further connected to the image display device 100, the screen of the image display device 100 is quartered to output the screens of the mobile terminals 200.

The image display device 100 may arrange the screens of the mobile terminals 200 connected to the image display device 100 according to a predetermined scenario.

The image display device 100 can also receive a user command and change the arrangement of the screens of the mobile terminals 200. That is, the present invention provides a user interface for changing the location and size of the screens of the mobile terminals 200.

Accordingly, the image display device 100 receives a user command corresponding to change in screens of the mobile terminals 200 and changes the screens of the mobile terminals 200 according to the received user command.

In particular, FIGS. 8 to 10 show examples of changing the arrangement of the screens of the mobile terminals 200 by entering a user command to the image display device 100.

FIG. 8 shows the user changing the locations of the screens of the mobile terminals 200. The screen 101 of the first mobile terminal 201 is output on a main screen and the other screens 102, 103 and 104 are output on a sub screen.

At this time, when the user enters a user command for dragging and dropping the second screen 102 to the first screen 101, the image display device 100 outputs the second screen 102 on the main screen and outputs the first screen 101 at the location of the second screen 102. That is, the image display device 100 changes the locations of the first screen 101 and the second screen 102.

The user command may be input using various methods such as selection of screens, the locations of which will be changed, in addition to a drag-and-drop method.

FIG. 9 shows the user changing the sizes of the screens of the mobile terminals 200. The first to fourth screens 101 to 104 are output on the image display device 100.

At this time, when the user enters a user command for changing the size of the first screen, the image display device 100 changes the size of the first screen according to the user command.

The image display device 100 changes the screens of the mobile terminals 200 according to the user command. However, the image display device 100 of the present invention can also change the arrangement of the screens of the mobile terminals 200 when an event has occurred in the mobile terminal 200.

In particular, FIG. 10 shows the image display device 100 changing arrangement of the screens of the mobile terminals 200 in order to notify the user that an event has occurred in the mobile terminal 200.

In FIG. 10, an event has occurred in the third mobile terminal 203. The image display device 100 thus arranges the third screen 103 corresponding to the third mobile terminal 203 at the foremost side of the screen and highlights the third screen 103 in order to notify the user that the event has occurred.

Thus, the user may perceive that the event has occurred in the third mobile terminal 203 and easily control the third mobile terminal 203 via the third screen 103.

The image display device 100 determines the screen to which the user command is input, that is, the screen of the target mobile terminal 200 to be controlled by the user. This is because the image display device 100 should send the received user command to the target mobile terminal 200 to be controlled by the user.

Figure 11:
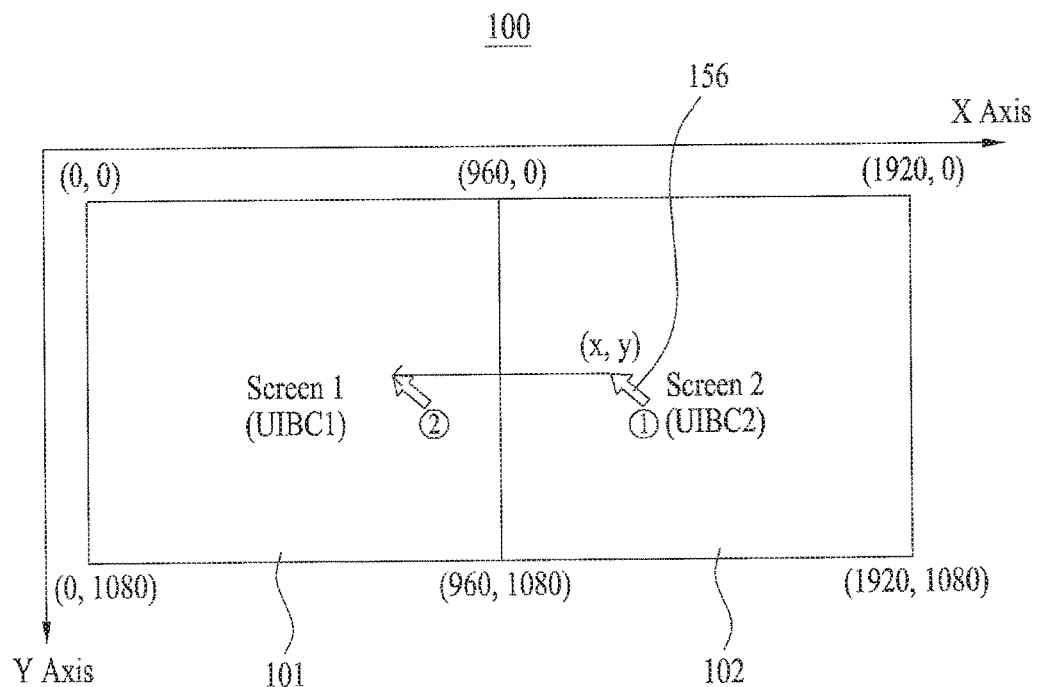
FIGS. 11 to 13 are diagrams illustrating a first embodiment of a multi UIBC service providing method of the present invention.
Figure 12:
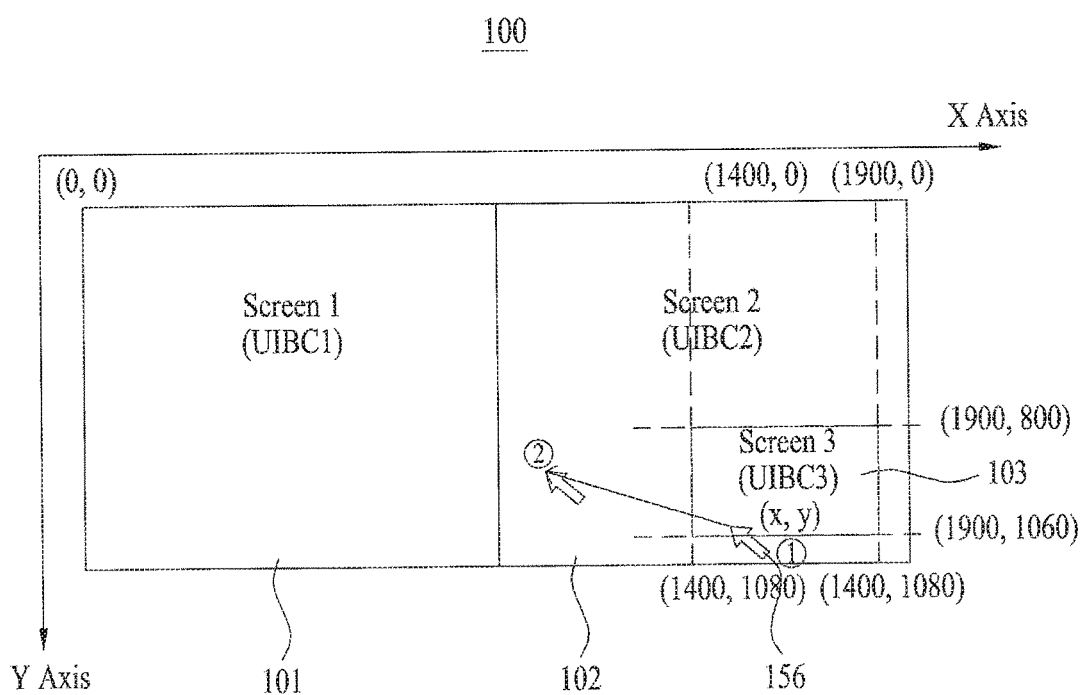
Figure 13:
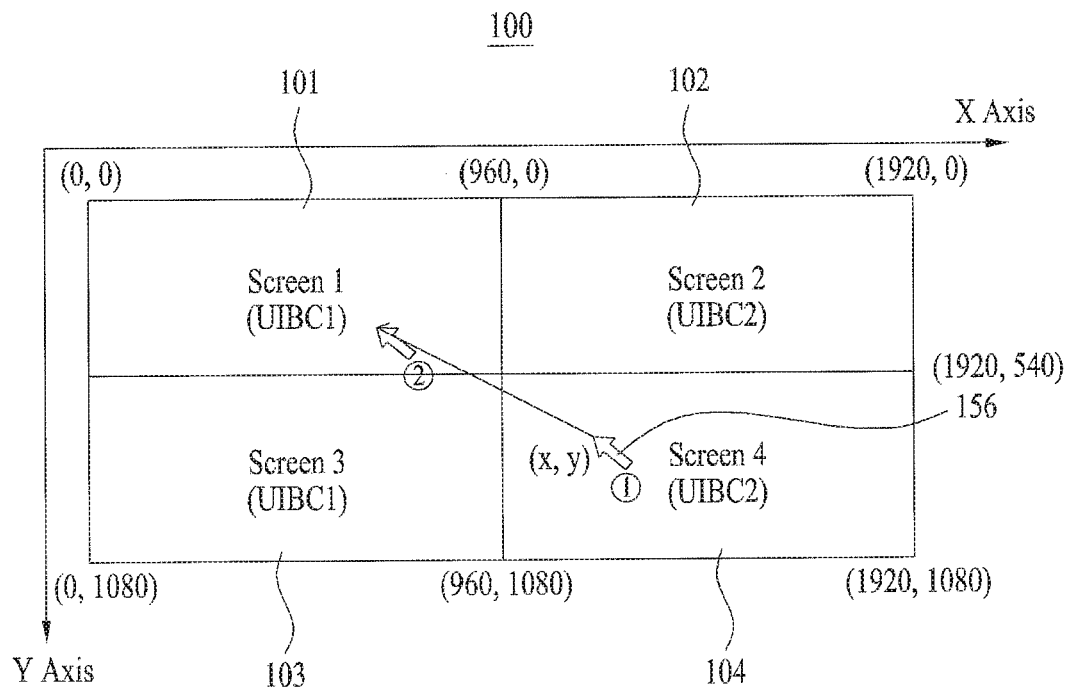

Next, FIGS. 11 to 13 are diagrams illustrating a first embodiment of a multi UIBC service providing method of the present invention.

In the first embodiment of the multi UIBC service providing method of the present invention, a method of efficiently determining the target mobile terminal 200 to be controlled by the user using location information of the screens and location information of a cursor at the image display device 100 is provided.

FIG. 11 shows two mobile terminals 200 are connected to the image display device 100, the first mobile terminal 201 is output on the first screen 101 and the second mobile terminal 202 is output on the second screen 102.

The image display device 100 generates boundary coordinate information of the first screen 101 and boundary coordinate information of the second screen 102. The boundary coordinate information is location and size information of a screen. The boundary coordinate information may be composed of coordinates of boundary points of the screen or coordinates of an original point of the screen and width/length information of the screen.

If the user points to the image display device 100 using the wireless remote controller 155 in order to control the mobile terminal 200, the image display device 100 outputs a cursor which is a guide image 156 at a point pointed to by the wireless remote controller 155. The image display device 100 generates coordinate information of the cursor 156 output at the point pointed to by the wireless remote controller 155.

The image display device 100 compares the boundary coordinate information of the first screen 101 and the second screen 102 with the coordinate information of the cursor 156 and determines which screen is pointed to by the user.

In FIG. 11, the user moves the cursor 156 from the second screen 102 to the first screen 101. If the cursor 156 is located on the second screen, the image display device 100 may determine that the mobile terminal 200 to be controlled by the user is the second mobile terminal 202 and, if the cursor 156 is located on the first screen, the image display device 100 may determine that the mobile terminal 200 to be controlled by the user is the first mobile terminal 201.

That is, the image display device 100 compares the boundary coordinate information of the mobile terminal 200 with the coordinate information of the cursor 156 of the wireless remote controller 155, determines the screen on which the cursor 156 is located, and determines the mobile terminal 200 corresponding to the determined screen as the target mobile terminal 200 to be controlled by the user.

Accordingly, the image display device 100 controls the interface 150 to establish communication in order to transmit and receive data to and from the mobile terminal 200 which is determined as the target mobile terminal 200.

FIG. 12 shows three mobile terminals 200 are connected to the image display device 100, the first mobile terminal 201 is output on the first screen 101, the second mobile terminal 202 is output on the second screen 102, and the third mobile terminal 203 is output on the third screen 103.

The image display device 100 generates boundary coordinate information of the first screen 101, boundary coordinate information of the second screen 102 and boundary coordinate information of the third screen 103. The boundary coordinate information is location and size information of a screen. The boundary coordinate information may be composed of coordinates of boundary points of the screen or coordinates of an original point of the screen and width/length information of the screen.

If the user points to the image display device 100 using the wireless remote controller 155 in order to control the mobile terminal 200, the image display device 100 outputs a cursor which is a guide image 156 at a point pointed to by the wireless remote controller 155. The image display device 100 generates coordinate information of the cursor 156 output at the point pointed to by the wireless remote controller 155.

The image display device 100 compares the boundary coordinate information of the first screen 101, the second screen 102 and the third screen 103 with the coordinate information of the cursor 156 and determines which screen is pointed to by the user.

FIG. 12 shows the user moves the cursor 156 from the third screen 103 to the second screen 102. If the cursor 156 is located on the third screen 103, the image display device 100 may determine that the mobile terminal 200 to be controlled by the user is the third mobile terminal 203 and, if the cursor 156 is located on the second screen, the image display device 100 may determine that the mobile terminal 200 to be controlled by the user is the second mobile terminal 202.

That is, the image display device 100 compares the boundary coordinate information of the mobile terminal 200 with the coordinate information of the cursor 156 of the wireless remote controller 155, determines the screen on which the cursor 156 is located, and determines the mobile terminal 200 corresponding to the determined screen as the target mobile terminal 200 to be controlled by the user.

FIG. 13 shows four mobile terminals 200 are connected to the image display device 100, the first mobile terminal 201 is output on the first screen 101, the second mobile terminal 202 is output on the second screen 102, the third mobile terminal 203 is output on the third screen 103, and the fourth mobile terminal 204 is output on the fourth screen 104. The image display device 100 generates boundary coordinate information of the first screen 101 to the fourth screen 104.

FIG. 13 shows the user moves the cursor 156 from the fourth screen 104 to the first screen 101. As described above, if the cursor 156 is located on the fourth screen, the image display device 100 may determine the mobile terminal 200 to be controlled by the user as the fourth mobile terminal 204 and, if the cursor 156 is located on the first screen, the image display device 100 may determine the mobile terminal 200 to be controlled by the user as the first mobile terminal 201.

The image display device 100 compares the boundary coordinate information of the mobile terminal 200 with the coordinate information of the cursor 156 of the wireless remote controller 155, determines the screen on which the cursor 156 is located, and determines the mobile terminal 200 corresponding to the determined screen as the target mobile terminal 200 to be controlled by the user.

Figure 14:
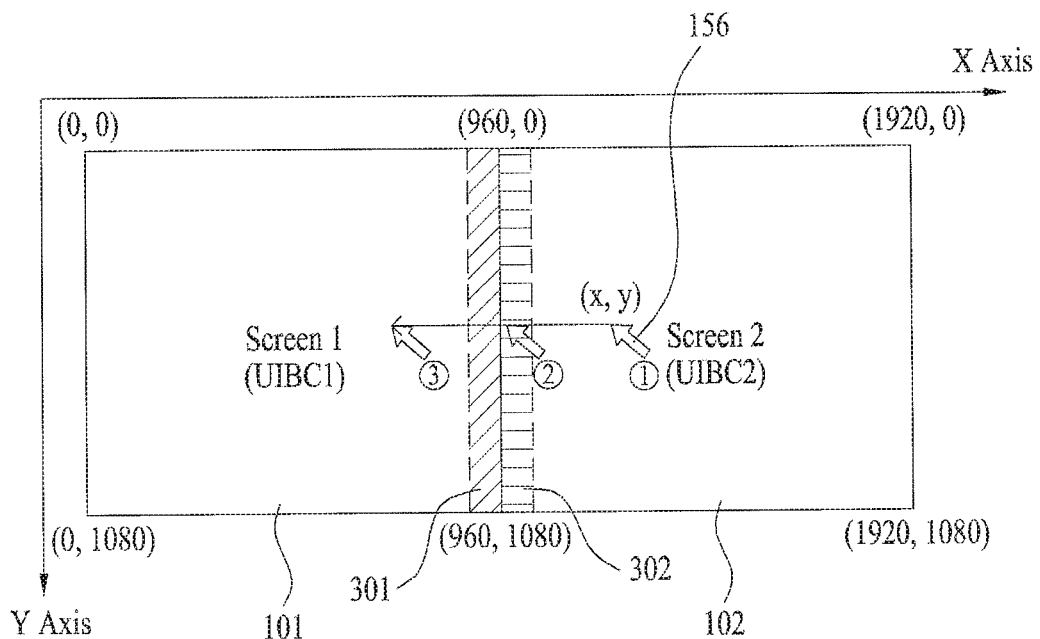
FIGS. 14 to 15 are diagrams illustrating a second embodiment of a multi UIBC service providing method of the present invention.
Figure 15:
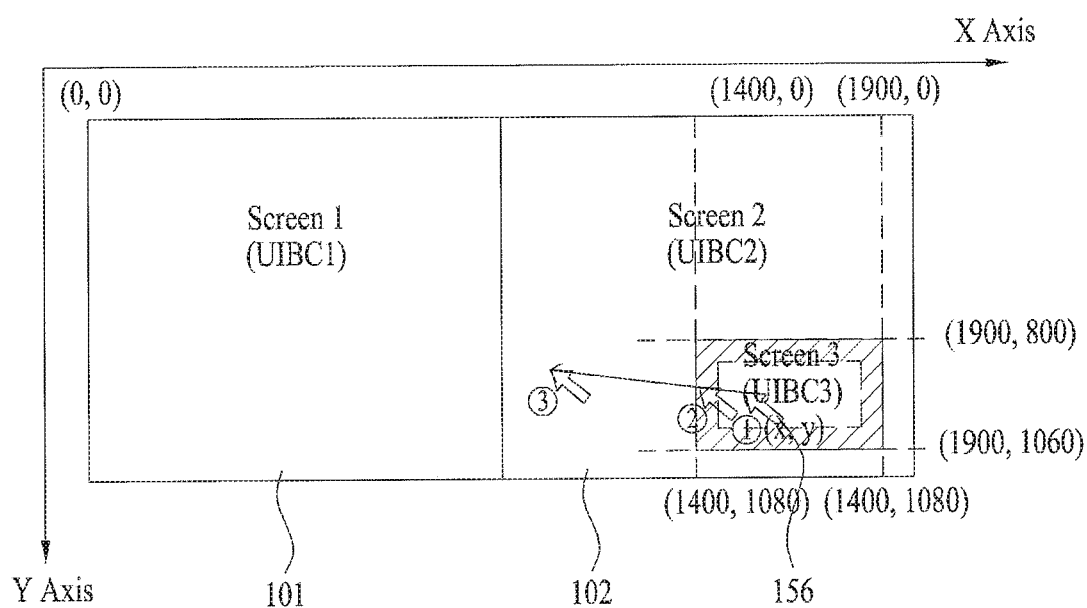

FIGS. 14 to 15 are diagrams illustrating a second embodiment of a multi UIBC service providing method of the present invention.

In the second embodiment of the multi UIBC service providing method of the present invention, the image display device 100 rapidly establishes communication with the changed target mobile terminal 200.

In particular, FIG. 14 shows two mobile terminals 200 are connected to the image display device 100, the first mobile terminal 201 is output on the first screen 101 and the second mobile terminal 202 is output on the second screen 102.

As described above, the image display device 100 generates boundary coordinate information of the first screen 101 and boundary coordinate information of the second screen 102. The boundary coordinate information is location and size information of a screen. The boundary coordinate information may be composed of coordinates of boundary points of the screen or coordinates of an original point of the screen and width/length information of the screen.

The image display device 100 may generate information about adjacent screens of the first screen 101 and the second screen 102. For example, adjacent screen connection regions 301 and 302 may be set or identification of the adjacent screens may be generated. The adjacent screen connection regions 301 and 302 are regions extending from the boundary with adjacent screens. The image display device 100 generates coordinate information of the adjacent screen connection regions and identification of the adjacent screens.

Unlike FIG. 14, as shown in FIG. 15, the present invention is applicable to the screen being split into three screen regions. As shown in FIG. 15, a third screen 103 is only adjacent to the second screen 102, and is not adjacent to the first screen 101. Accordingly, identification of an adjacent screen does not need to be generated between the third screen 103 and the first screen 101.

The first adjacent screen connection region 301 is set on the first screen 101 and corresponds to a predetermined region from the boundary with the second screen 102 adjacent to the first screen 101. The first adjacent screen connection region 301 includes information about the second screen 102 which is an adjacent screen of the first screen 101.

The second adjacent screen connection region 302 is set on the second screen 102 and corresponds to a predetermined region from the boundary with the first screen 101 adjacent to the second screen 102. The second adjacent screen connection region 302 includes information about the first screen 101 adjacent to the second screen 102.

As shown in FIG. 14, if the user moves the wireless remote controller 155 from the second screen 102 to the first screen 101 in order to change the target mobile terminal 200, the cursor moves from the second screen 102 to the first screen 101 first passing through the second adjacent screen connection region 302.

At this time, the image display device 100 determines whether the cursor is located in the adjacent screen connection regions 301 and 302. If the cursor is located in the adjacent screen connection regions 301 and 302, the image display device 100 establishes communication with the mobile terminal 200 corresponding to the adjacent screen connection regions 301 and 302.

In more detail, as shown in FIG. 14, if the user moves the wireless remote controller 155 from the second screen 102 to the first screen 101 in order to change the target mobile terminal 200 to the first mobile terminal 201, the cursor 156 first passes through the second adjacent screen connection region 302.

Thus, when the cursor 156 is located in the second adjacent screen connection region 302, the image display device 100 prepares to provide a UIBC service for the first screen 101 adjacent to the second screen 102. That is, the image display device 100 establishes data communication with the first mobile terminal 201 corresponding to the first screen 101 when the cursor 156 first moves into the second connection region 302 included in the second screen 102.

The second screen 102 in FIG. 14 corresponds to the second mobile terminal 102. However, the second screen 102 could be a screen displayed by the display device 100 itself (e.g., a broadcast program).

If the user changes the target mobile terminal 200, it is possible to rapidly establish communication with the changed target mobile terminal 200 and to efficiently provide the UIBC service to the user.

In FIG. 14, the cursor 156 may pass through the second adjacent screen connection region 302 and be located in the first adjacent screen connection region 301. In this instance, the image display device 100 may ignore the cursor 156 being previously located in the first adjacent screen connection region 301.

FIG. 15 shows three mobile terminals 200 are connected to the image display device 100, the first mobile terminal 201 is output on the first screen 101, the second mobile terminal 202 is output on the second screen 102 and the third mobile terminal 203 is output on the third screen 103.

As described above, the image display device 100 generates boundary coordinate information of the first screen 101, the second screen 102 and the third screen 103 and sets the adjacent screen connection regions 301, 302 and 303 of the first screen 101, the second screen 102 and the third screen 103.

The adjacent screen connection regions 301, 302 and 303 are predetermined regions extending from the boundaries of adjacent screens and include coordinate information of the regions and information about adjacent screens.

The first adjacent screen connection region 301 is set on the first screen 101 and corresponds to a predetermined region extending from the boundary with the second screen 102 adjacent to the first screen 101. The first adjacent screen connection region 301 includes information about the second screen 102 which is the adjacent screen of the first screen.

The second adjacent screen connection region 302 is set on the second screen 102 and corresponds to a predetermined region extending from the boundary with the first screen 101 adjacent to the second screen 102. The second adjacent screen connection region 302 includes information about the first screen 101 which is the adjacent screen of the second screen.

The third adjacent screen connection region 303 is set on the third screen in the third screen 103 and corresponds to a predetermined region extending from the boundary with the second screen 102 adjacent to the third screen 103. The third adjacent screen connection region 303 includes information about the second screen 102 which is the adjacent screen of the third screen 103.

As shown in FIG. 15, if the user moves the wireless remote controller 155 from the third screen 103 to the second screen 102 in order to change the target mobile terminal 200, the cursor moves from the third screen 103 to the second screen 102 through the third adjacent connection region 303.

At this time, the image display device 100 determines whether the cursor is located in the adjacent screen connection regions 301, 302 and 303 and establishes communication with the mobile terminals 200 corresponding to the adjacent screen connection regions 301, 302 and 303 if the cursor is located in the adjacent screen connection regions 301, 302 and 303.

In FIG. 15, if the user moves the wireless remote controller 155 from the third screen 103 to the second screen 102 in order to change the target mobile terminal 200 to the second mobile terminal 202, the cursor 156 passes through the third adjacent screen connection region 303.

If the cursor 156 is located in the third adjacent screen connection region 303, the image display device 100 prepares to provide a UIBC service for the second screen 102 adjacent to the third screen 103. That is, the image display device 100 establishes data communication with the second mobile terminal 202 corresponding to the second screen 102.

Figure 16:
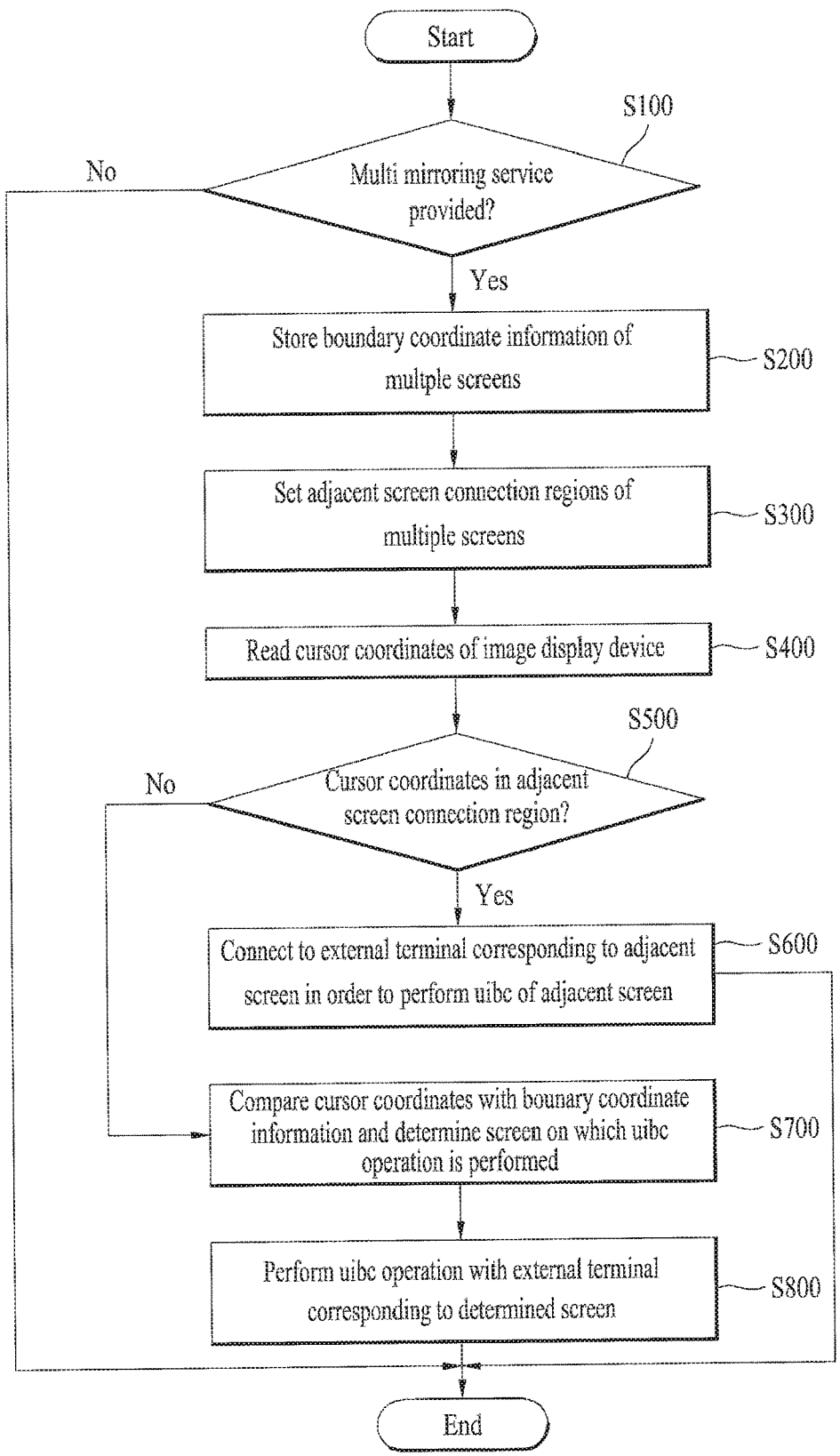
FIG. 16 is a flowchart illustrating a user interface provision method according to a first embodiment of the present invention.

Next, FIG. 16 is a flowchart illustrating a user interface provision method according to a first embodiment of the present invention.

The user interface provision method according to the first embodiment of the present invention includes determining whether the image display device 100 is providing a multi mirroring service (S100), generating and storing boundary coordinate information of multiple screens (S200), setting the respective adjacent screen connection regions 300 of the multiple screens (S300), reading the coordinates of the cursor 156 of the image display device 100 (S400), determining whether the coordinates of the cursor 156 correspond to the adjacent screen connection regions 300 (S500), establishing data communication with the mobile terminal 200 corresponding to an adjacent screen (S600), comparing the coordinates of the cursor 156 with boundary coordinate information to determine on which screen a UIBC operation is performed (S700), and performing the UIBC operation with the mobile terminal 200 corresponding to the determined screen (S800).

First, the image display device 100 determines whether the multi mirroring service is being provided (S100).

As described above, the multi mirroring service indicates that several mobile terminals 200 are connected to one image display device 100 to simultaneously output the screens of the mobile terminals 200 via the image display device 100. The user interface method of the present invention provides a multi UIBC service configured to allow the user to control several mobile terminals 201 and 202 via the image display device 100 if such a multi mirroring service is provided.

The image display device 100 stores boundary coordinate information of the multiple screens (S200). The boundary coordinate information may be composed of coordinates of boundary points of the screen or coordinates of an original point of the screen and width/length information of the screen.

The image display device 100 sets the adjacent screen connection regions 300 of the multiple screens (S300). The adjacent screen connection regions 301 and 302 are regions extending from the boundary with adjacent screens and include coordinate information of the corresponding region and information about the adjacent screen.

The image display device 100 reads the coordinates of the cursor 156 of the image display device 100 (S400).

If the user points to the image display device 100 using the wireless remote controller 155 in order to control the mobile terminal 200, the image display device 100 outputs the cursor which is the guide information 156 at the point pointed to by the wireless remote controller 155. The image display device 100 generates and reads the coordinate information of the cursor output at the point pointed to by the wireless remote controller 155.

The image display device 100 determines whether the coordinates of the cursor 156 correspond to the adjacent screen connection regions 300 (S500). If the cursor 156 is located in the adjacent screen connection regions 301 and 302, the image display device 100 establishes communication with the mobile terminal 200 corresponding to the adjacent screen in order to perform UIBC of the adjacent screen (S600).

The image display device 100 compares the coordinates of the cursor 156 with the boundary coordinate information to determine the screen on which the UIBC operation is performed (S700).

That is, the image display device 100 compares the boundary coordinate information of each screen with the coordinate information of the cursor 156, determines the screen on which the cursor is located, and determines the mobile terminal 200 corresponding to the determined screen as the target mobile terminal 200 to be controlled by the user.

Finally, the image display device 100 performs the UIBC operation with the mobile terminal 200 corresponding to the determined screen (S800).

Thereafter, a user interface provision method for allowing a user to efficiently control the shared screens if the screens of the image display device 100 and the mobile terminals 200 are shared will be described.

Figure 17:
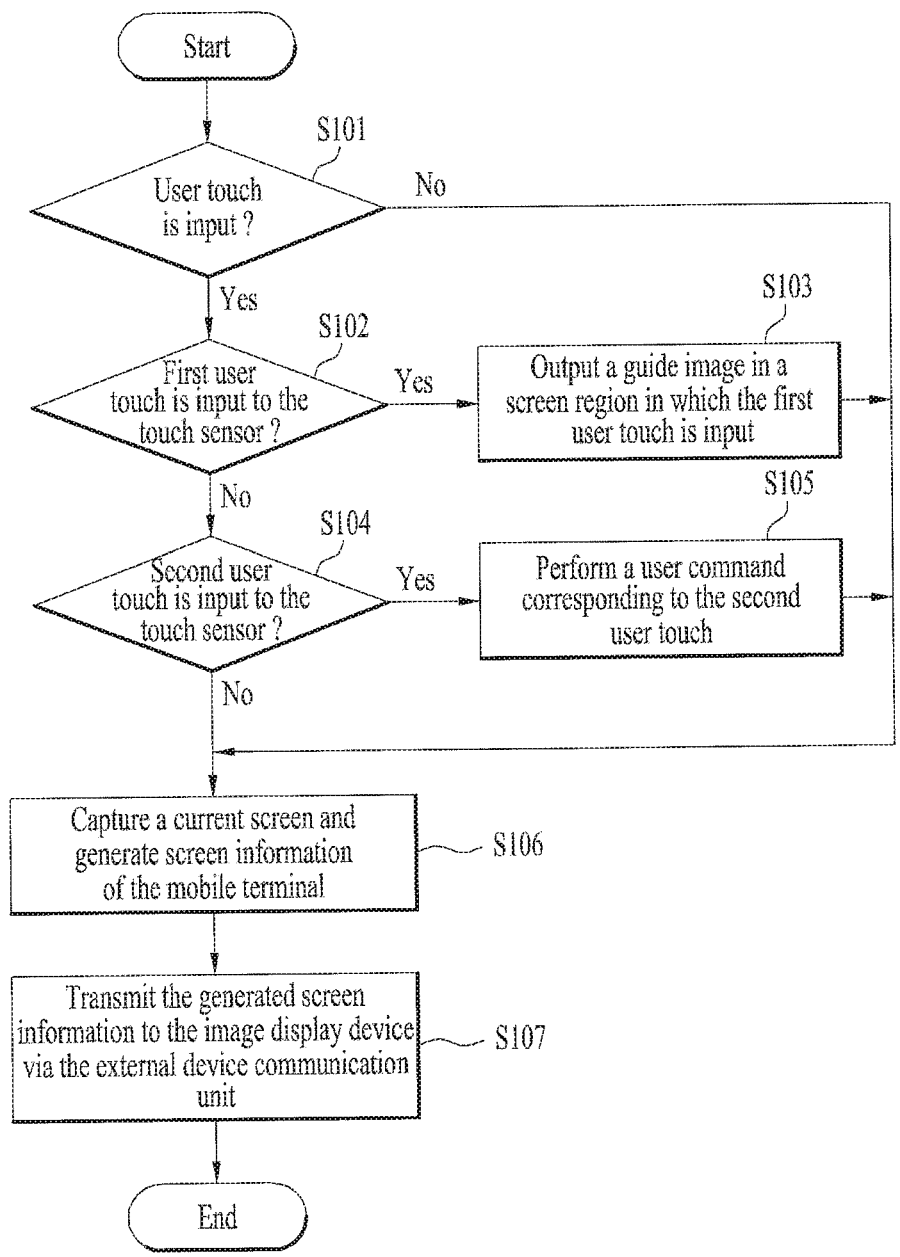
FIGS. 17 and 18 are flowcharts illustrating a user interface provision method according to a second embodiment of the present invention.
Figure 18:
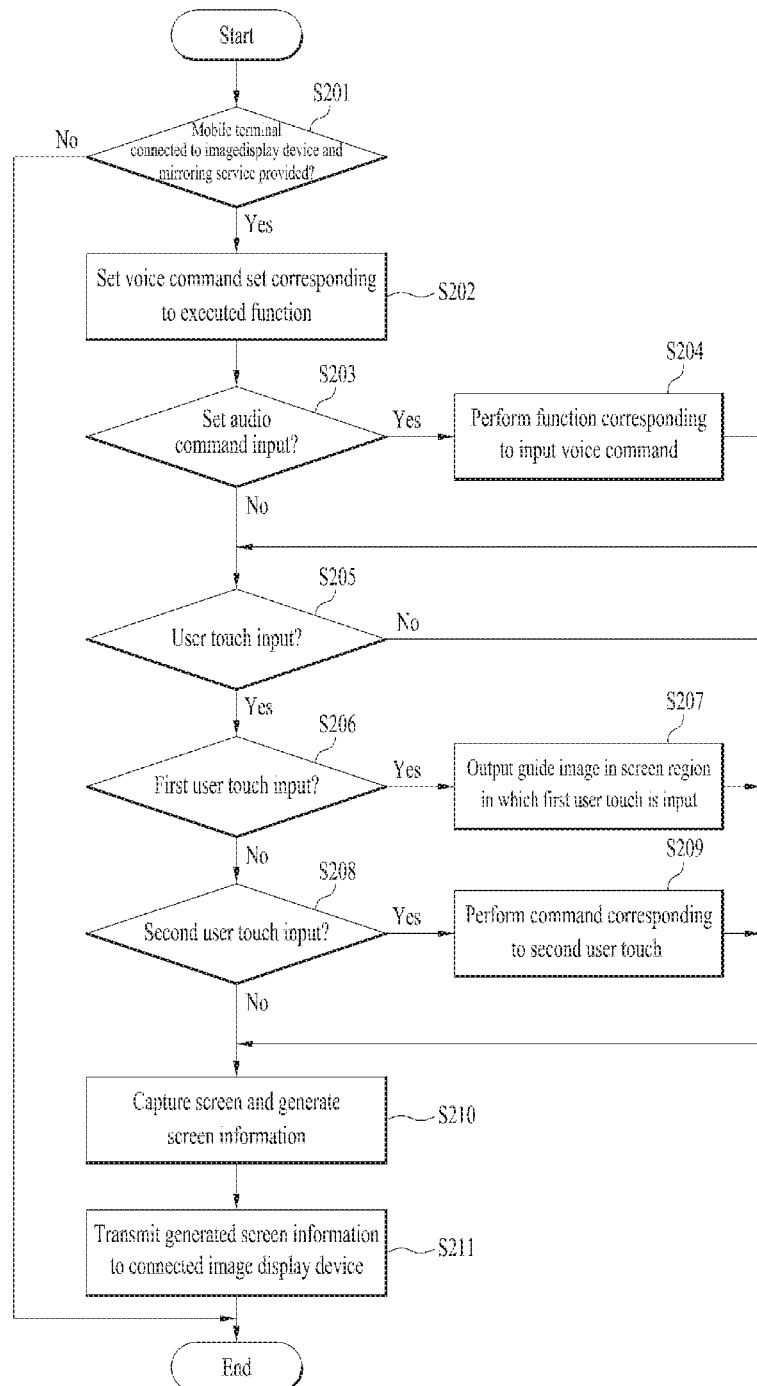

FIGS. 17 and 18 are flowcharts illustrating a user interface provision method according to a second embodiment of the present invention.

First, referring to FIG. 17, the mobile terminal 200 determines whether a user touch is input (S101). The controller 280 of the mobile terminal 200 determines whether the user touch is input to the touch sensor.

If the user touch is not input to the touch sensor, the controller 280 captures a current screen and generates screen information of the mobile terminal 200 (S106). The controller 280 transmits the generated screen information to the image display device 100 via the external device communication unit 271 (S107).

If the user touch is input to the touch sensor, the controller 280 determines whether the first user touch is input to the touch sensor (S102). That is, the controller 280 determines whether the user touch input to the touch sensor is a first user touch.

As described above, the touch sensor may distinguishably sense the received user touch as a first user touch or a second user touch. The touch sensor includes a first touch sensor for sensing a first user touch and a second touch sensor for sensing a second user touch.

In the present invention, a user touch may be divided into a first user touch and a second user touch according to various criteria. That is, the touch sensor may distinguishably sense a first user touch and a second user touch according to various criteria.

For example, the touch sensor may recognize a touch of a small region as the first user touch and recognize a touch of a large region as a second user touch. The touch sensor may recognize a touch of a short period of time as the first user touch and recognize a touch of a long period of time as the second user touch. The touch sensor may recognize a touch of weak pressure as the first user touch and recognize a touch of strong pressure as the second user touch. The touch sensor may recognize a touch of a specific gesture as the first user touch and a touch thereafter as the second user touch.

At this time, the controller 280 recognizes the first user touch as a first user command and recognizes the second user touch as a second user command and controls the mobile terminal 200 according to the user command.

In the present specification, assume that the first user touch is a touch of weak pressure and the second user touch is a touch of strong pressure.

Accordingly, the controller 280 determines whether a first user touch is input using the first touch sensor. That is, the controller 280 determines whether a first user touch which is a touch of weak pressure is input using the first touch sensor.

If the first user touch is input to the touch sensor, the controller 280 controls the output unit 250 to output a guide image 156 in a screen region in which the first user touch is input (S103).

The guide image 156 indicates the screen region in which the first user touch is sensed and may be output in the form of a pointer, an icon, etc. In the present specification, for example, the controller 280 outputs a pointer image as the guide image 156.

Accordingly, if the user inputs a first user touch in a specific region of the screen, the controller 280 outputs the guide image 156 in the screen region in which the first user touch is input.

If the first user touch is not input to the touch sensor, the controller 280 determines whether a second user touch is input to the touch sensor (S104). That is, the controller 280 determines whether a second user touch which is a user touch of strong pressure is input using the second touch sensor.

If the second user touch is input to the touch sensor, the controller 280 performs a user command corresponding to the second user touch (S105). That is, the controller 280 analyzes the user command corresponding to second user touch and controls the mobile terminals 200 according to the user command.

Finally, the controller 280 captures a current screen and generates screen information of the mobile terminal 200 (S106). The controller 280 transmits the generated screen information to the image display device 100 via the external device communication unit 271 (S107).

FIG. 18 is a flowchart illustrating a user interface provision method using the mobile terminals 200 and the image display device 100 according to another embodiment of the present invention.

First, the controller 280 determines whether the mobile terminals 200 are connected to the image display device 100 for data communication so as to provide a mirroring service for transmitting the screens of the mobile terminals 200 to the image display device 100 (S201).

If the mirroring service is being provided, the controller 280 sets a voice command set corresponding to functions which are being executed by the mobile terminals 200 (S202). For example, if moving-image navigation is executed on the mobile terminal 200, the controller 280 may previously set a voice command set of "rewind", "fast forward", "play" and "stop" corresponding to moving-image navigation functions. In addition, if an Internet browser is being executed on the mobile terminal 200, the controller 280 may previously set a voice command set of "selection", "click" and "back" corresponding to the functions of the Internet browser, such that the controller 280 recognizes only predetermined voice commands so as to rapidly perform the functions.

The controller 280 determines whether a predetermined voice command is received (S203). The controller 280 may enter a voice recognition mode in order to recognize the predetermined voice command. The controller 280 may output a screen corresponding to a voice standby mode via the output unit 250, in order to notify the user of entrance into the voice standby mode.

If a voice command is received, the controller 280 performs a function corresponding to the received voice command (S204). The controller 280 analyzes a user command corresponding to the received voice command and executes the user command.

If the voice command is not received, the controller 280 performs the user interface provision method described with reference to FIG. 4 (S101 to S107). That is, if the user inputs a first user touch in a specific region of the screen, the controller 280 outputs the guide image 156 in the screen region in which the first user touch is input. If the user inputs a second user touch, the controller 280 executes the user command corresponding to the second user touch.

The user interface provision method may be implemented using various embodiments. Hereinafter, user interfaces according to various embodiments of the present invention will be described.

Next, FIGS. 19 to 23 are diagrams illustrating a first embodiment of a user interface provision method for controlling the screen of an image display device 100 of the present invention.

Figure 19:
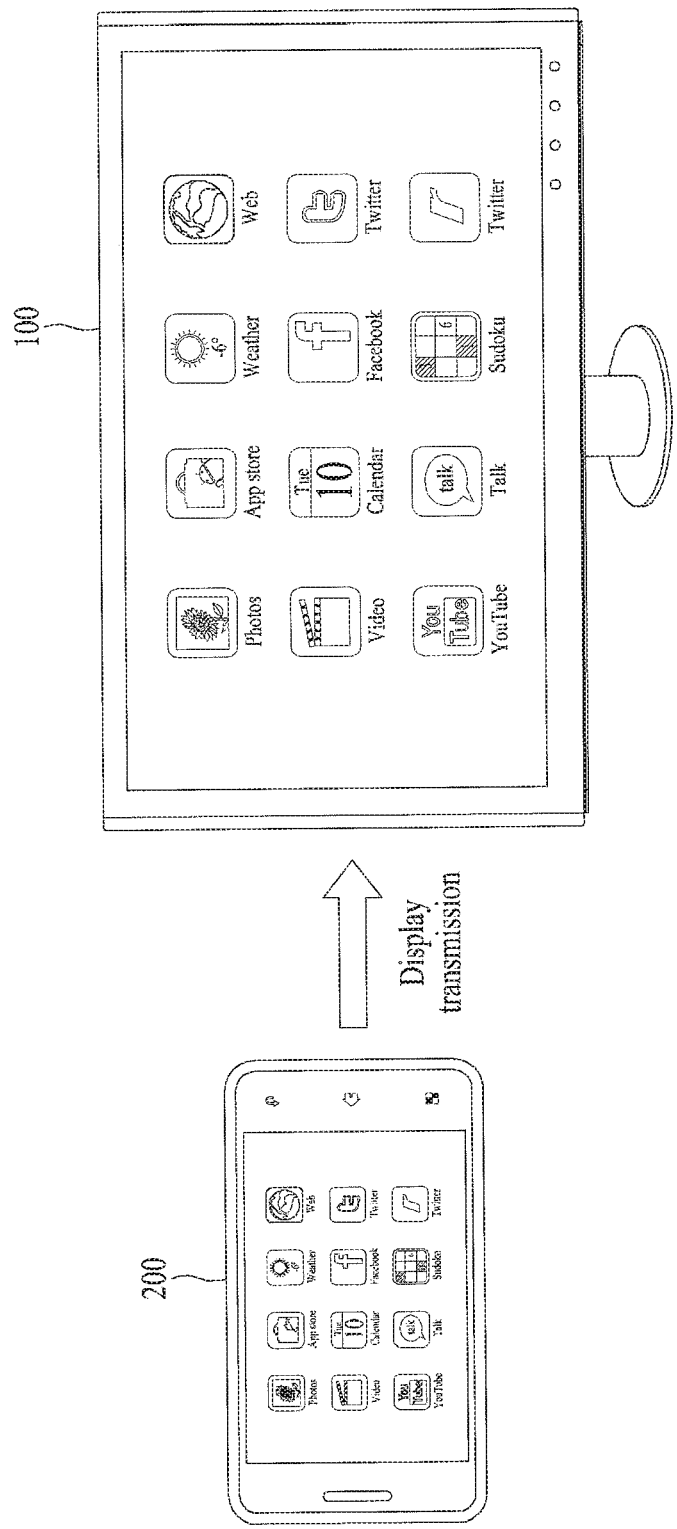
FIGS. 19 to 23 are diagrams illustrating a first embodiment of a user interface provision method for controlling the screen of an image display device of the present invention.

FIG. 19 shows a user interface environment according to the first embodiment of the user interface provision method for controlling the screen of the image display device 100 of the present invention.

The mobile terminal 200 transmits the screen information of the mobile terminal 200 to the image display device 100 through data communication. The image display device 100 outputs the received screen information of the mobile terminal 200 to the user.

That is, the image display device 100 receives and outputs the screen information of the mobile terminal 200, such that the image display device 100 and the mobile terminal 200 output the same screen. Thus, the user may receive the screen of the mobile terminal 200 from the mobile terminal 200 and the image display device 100.

In FIG. 19, an application icon screen which is the screen of the mobile terminal 200 is transmitted to the image display device 100 and is equally output on the image display device 100.

Figure 20:
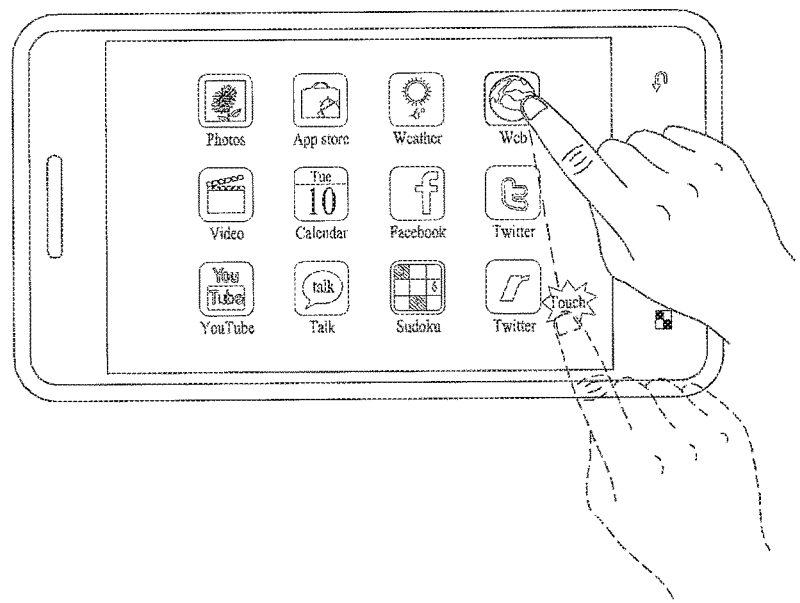
Figure 21:
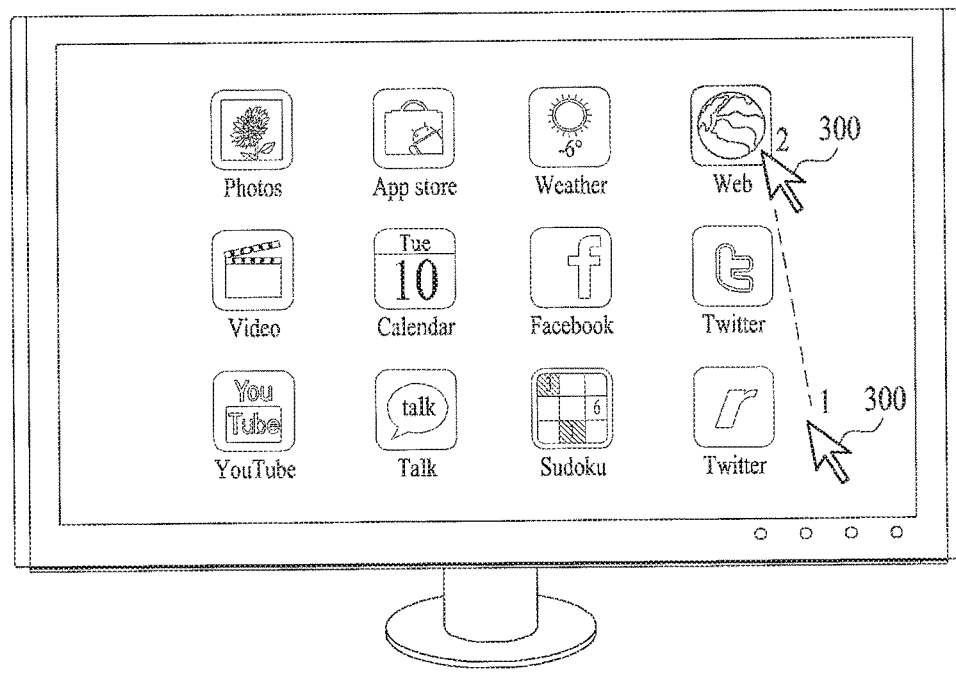

FIG. 20 shows the user inputting a first user touch to the mobile terminal 200 and FIG. 21 shows the screen of the image display device 100 if a first user touch is input to the mobile terminal 200.

In FIG. 20, the user inputs a first user touch in one right lower region of the mobile terminal 200. Then, the user drags the first user touch to a region in which an application icon "Web" is displayed. That is, the user inputs a touch of weak pressure in one right lower region of the mobile terminal 200 and then drags the first user touch to a region in which an application icon "Web" is displayed.

At this time, the controller 280 of the mobile terminal 200 controls the output unit 250 and outputs the guide image 156 in the screen region in which the first user touch is input.

As described above, the guide image 156 indicates the screen region in which the first user touch is sensed. In FIG. 21, the controller 280 outputs a pointer as the guide image 156. Accordingly, if the user inputs the first user touch in one region of the screen, the controller 280 outputs the pointer in the screen region in which the first user touch is input.

As shown in FIG. 20, if the user inputs the first user touch in one right lower region of the mobile terminal 200 and then drags the first user touch to a region in which an application icon "Web" is displayed, the controller 280 outputs the guide image 156 according to the region in which the first user touch is input.

The controller 280 captures a current screen of the mobile terminal 200, generates screen information of the mobile terminal 200, and transmits the generated screen information to the image display device 100 via the external device communication unit 271. The transmitted screen information of the mobile terminal 200 is information about the screen on which the guide image 156 according to the first user touch is further displayed.

The image display device 100 outputs the screen information of the mobile terminal 200 on the display 170.

FIG. 21 shows the output of the screen information of the mobile terminal 200 transmitted to the image display device 100, in which the guide image 156 according to the first user touch is further displayed. That is, the pointer which is the guide image 156 is output while moving from the right lower region, in which the first user touch is input, of the screen to the region in which the application icon "Web" is displayed.

Figure 22:
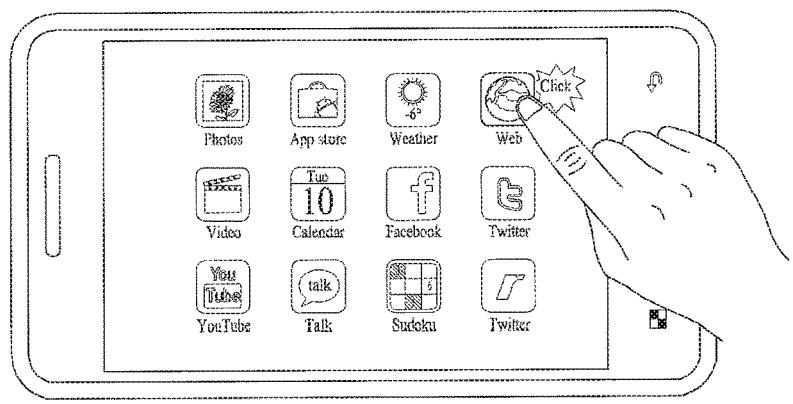
Figure 23:
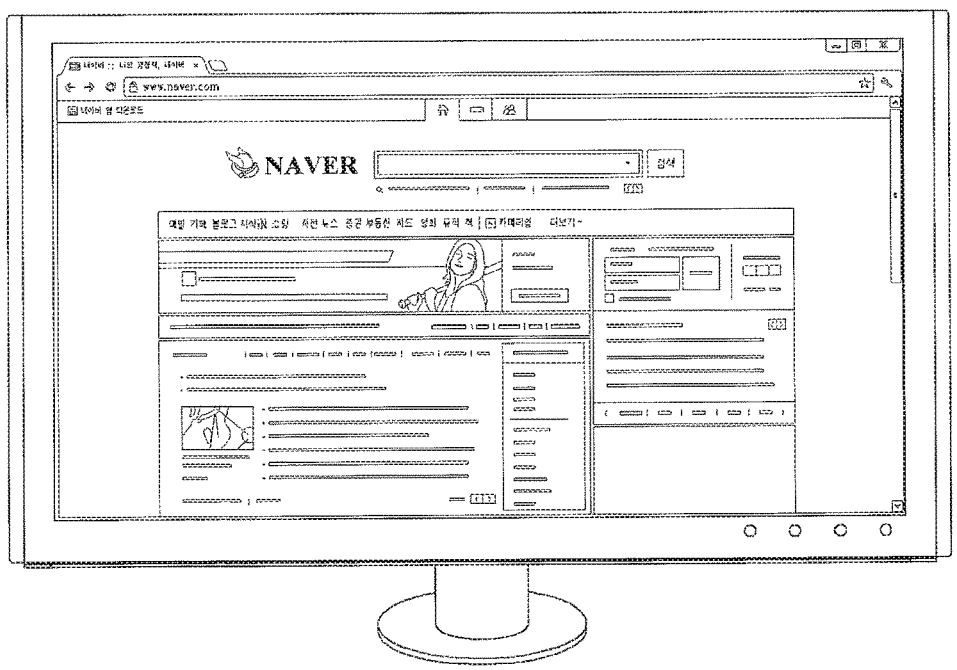

FIG. 22 shows the user inputting a second user touch to the mobile terminal 200 and FIG. 23 shows the screen of the image display device 100 if a second user touch is input to the mobile terminal 200.

In FIG. 22, the user inputs the second user touch in the region, in which an application icon "Web" is displayed, of the mobile terminal 200. That is, the user inputs a touch of a strong pressure in the region in which an application icon "Web" is displayed.

At this time, the controller 280 of the mobile terminal 200 executes the user command corresponding to the second user touch. That is, the controller 280 analyzes the user command corresponding to the second user touch and controls the mobile terminal 200 according to the user command.

Accordingly, the controller 280 analyzes the user command corresponding to the second user touch as execution of the application "Web" and thus executes the application "Web".

The controller 280 captures a current screen of the mobile terminal 200, generates screen information of the mobile terminal 200, and transmits the generated screen information to the image display device 100 via the external device communication unit 271. The transmitted screen information of the mobile terminal 200 is information about the screen on which the application "Web" is executed.

The image display device 100 outputs the screen information of the mobile terminal 200 on the display 170.

FIG. 23 shows the output of the screen information of the mobile terminal transmitted to the image display device 100, in which the application "Web" is executed. That is, the screen of the application "Web" executed according to the second user touch is output.

In control of the screen output on the image display device 100 using the mobile terminal 200, the user may manipulate the mobile terminal 200 in a state of fixing their eyes on the image display device 100, thereby increasing user convenience. That is, it is possible to solve user inconvenience in which the user should manipulate the mobile terminal 200 while alternately viewing the mobile terminal 200 and the image display device 100.

In display of the guide image 156 corresponding to the user command on the screen, a complicated protocol for calculating the input location of the user command does not need to be mounted between devices and thus complexity of the user interface can be significantly reduced.

Next, FIGS. 24 to 28 are diagrams illustrating a second embodiment of a user interface provision method for controlling the screen of an image display device 100 of the present invention.

Figure 24:
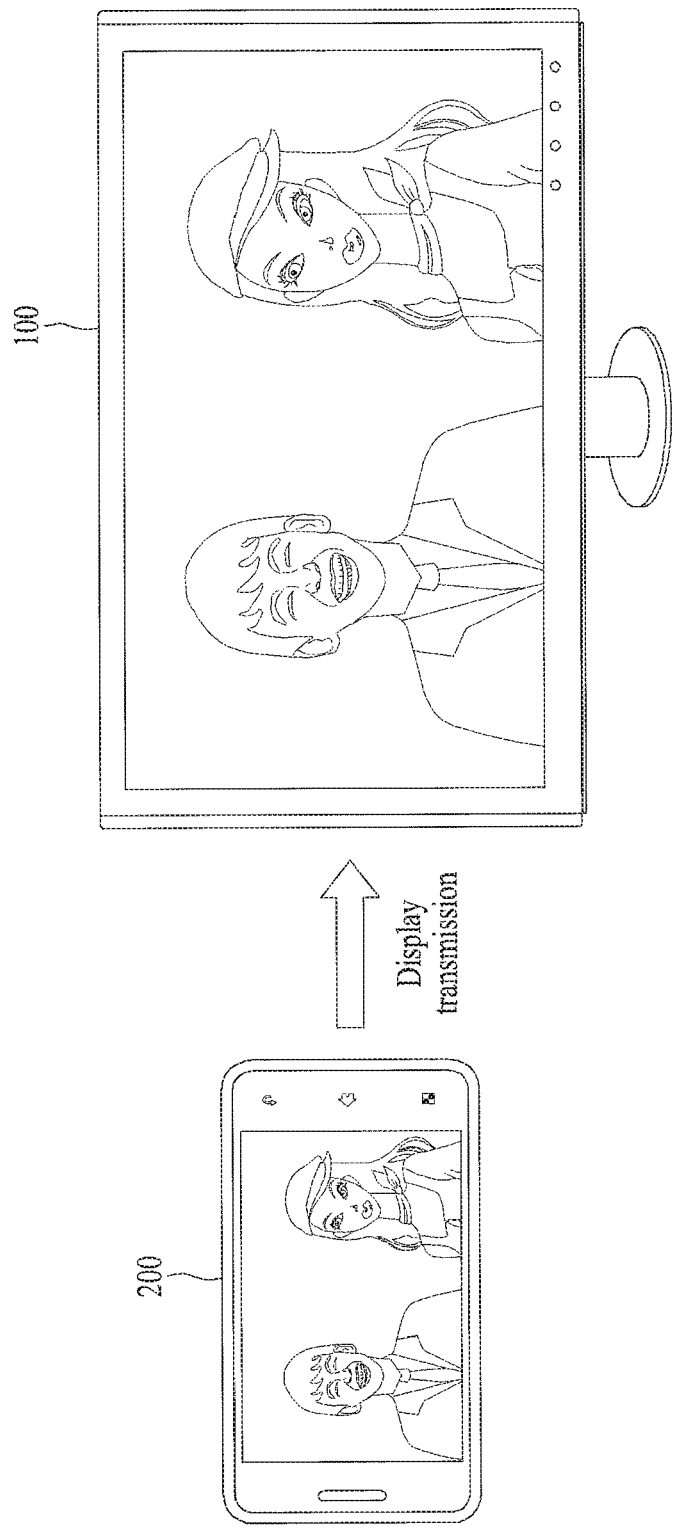
FIGS. 24 to 28 are diagrams illustrating a second embodiment of a user interface provision method for controlling the screen of an image display device of the present invention.

FIG. 24 shows a user interface environment according to the second embodiment of the user interface provision method for controlling the screen of the image display device 100 of the present invention.

The mobile terminal 200 transmits the screen information of the mobile terminal 200 to the image display device 100 through data communication. The image display device 100 outputs the screen information of the mobile terminal 200 to the user.

That is, the image display device 100 receives and outputs the screen information of the mobile terminal 200, such that the image display device 100 and the mobile terminal 200 output the same screen. Thus, the user may receive the screen of the mobile terminal 200 from the mobile terminal 200 and the image display device 100.

In FIG. 24, a moving image screen which is the screen of the mobile terminal 200 is transmitted to the image display device 100 and is equally output on the image display device 100.

Figure 25:
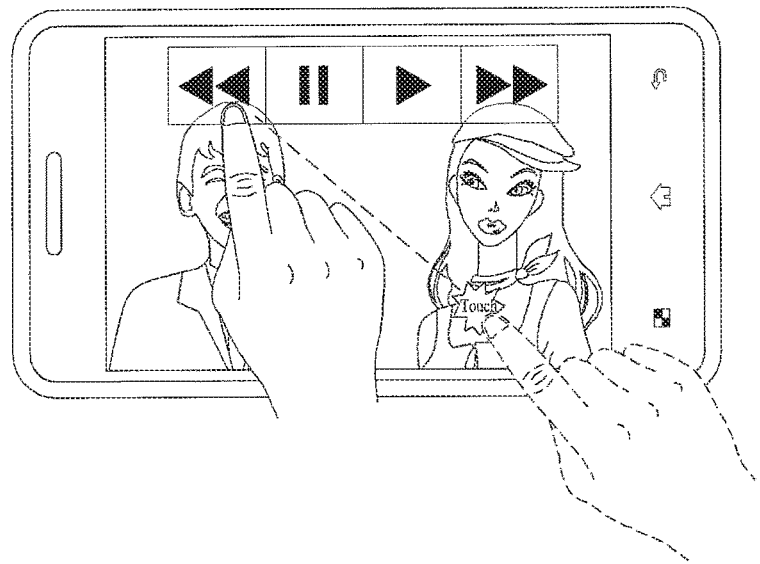
Figure 26:
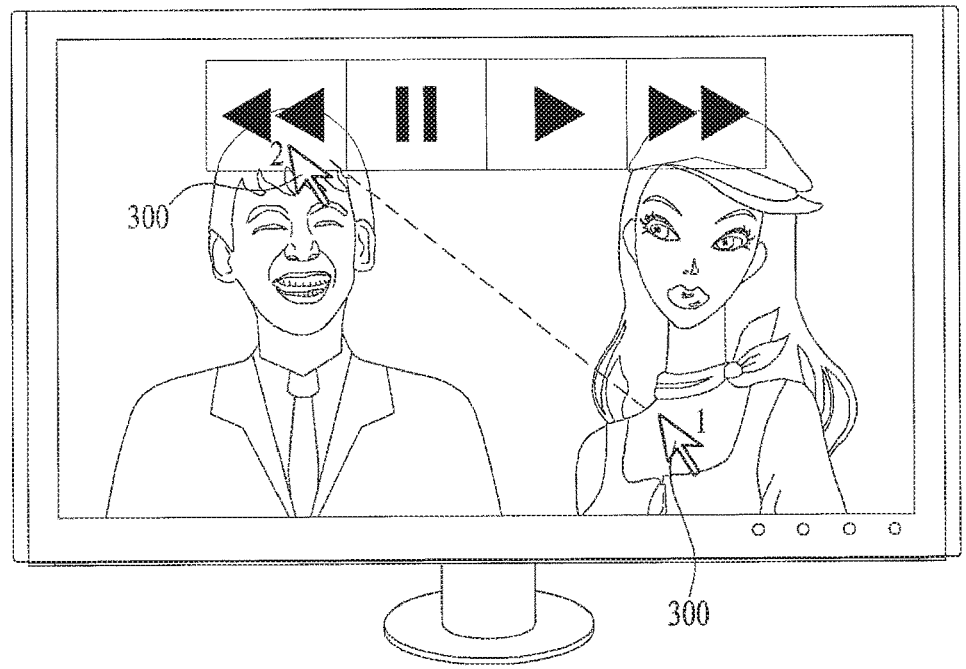

FIG. 25 shows the user inputting a first user touch to the mobile terminal 200 and FIG. 26 shows the screen of the image display device 100 if a first user touch is input to the mobile terminal 200.

In FIG. 25, the user inputs a first user touch in one right lower region of the mobile terminal 200. Then, the user drags the first user touch to a "rewind" menu region. That is, the user inputs a touch of weak pressure in one right lower region of the mobile terminal 200 and then drags the first user touch to a "rewind" menu region.

If the first user touch is input to the mobile terminal 200, the controller 280 of the mobile terminal 200 executes the user command corresponding to the first user touch. That is, the controller 280 may analyze the user command corresponding to the second user touch and controls the mobile terminal 200 according to the user command.

If a first user touch is input to the mobile terminal 200 when a moving image is played back on the mobile terminal 200 as shown in FIG. 25, the controller 280 may recognize the first user touch as a user command for executing moving-image navigation. The controller 280 executes the user command corresponding to the first user touch and controls the output unit 250 to output a moving-image navigation screen.

The controller 280 controls the output unit 250 to output the guide image 156 in the screen region in which the first user touch is input. As shown in FIG. 25, if the user inputs the first user touch in one region of the screen, the controller 280 outputs the pointer 300 in the screen region in which the first user touch is input.

As shown in FIG. 25, if the user inputs the first user touch in one right lower region of the mobile terminal 200 and then drags the first user touch to the "rewind" menu region, the controller 280 outputs the guide image 156 along the region in which the first user touch is input.

The controller 280 captures a current screen of the mobile terminal 200, generates screen information of the mobile terminal 200, and transmits the generated screen information to the image display device 100 via the external device communication unit 271.

For example, if the mobile terminal 200 and the image display device 100 are connected via Wi-Fi, the controller 280 transmits the screen information of the mobile terminal 200 to the image display device 100 via Wi-Fi data communication. Then, the controller 280 encodes the screen information of the mobile terminal 200 and transmits the encoded screen information to the image display device 100. The image display device 100 decodes the received screen information and outputs the decoded screen information.

The screen information of the mobile terminal 200 is information about the screen on which the user command corresponding to the first user touch is executed and the guide image 156 according to the first user touch is further displayed.

The image display device 100 outputs the screen information of the mobile terminal 200 on the display 170.

FIG. 26 shows the output of the screen information of the mobile terminal 200 transmitted to the image display device 100, in which a moving-image navigation screen is output and the guide image 156 according to the first user touch is further displayed. The pointer which is the guide image 156 is output while moving from the right lower region of the screen, in which the first user touch is input, to the "rewind" menu region.

Figure 27:
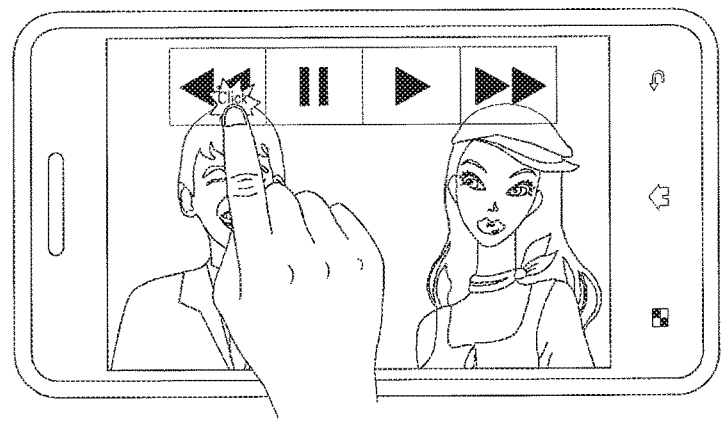
Figure 28:

FIG. 27 shows the user inputting a second user touch to the mobile terminal 200 and FIG. 28 shows the screen of the image display device 100 if the second user touch is input to the mobile terminal 200.

In FIG. 27, the user inputs the second user touch in the "rewind" menu region of the mobile terminal 200. That is, the user inputs a touch of strong pressure in the "rewind" menu region.

At this time, the controller 280 of the mobile terminal 200 executes the user command corresponding to the second user touch. That is, the controller 280 may analyze the user command corresponding to the second user touch and controls the mobile terminal 200 according to the user command.

Accordingly, the controller 280 executes the "rewind" menu according to the user command corresponding to the second user touch. The controller 280 captures a current screen of the mobile terminal 200, generates screen information of the mobile terminal 200, and transmits the generated screen information to the image display device 100 via the external device communication unit 271. The transmitted screen information is information about the screen on which the "rewind" menu of the moving image is executed.

The image display device 100 outputs the screen information of the mobile terminal 200 on the display 170.

FIG. 28 shows the output of the screen information of the mobile terminal 200 transmitted to the image display device 100, in which the "rewind" menu is executed. That is, the screen on which the "rewind" menu is executed according to the second user touch is output.

Next, FIGS. 29 to 33 are diagrams illustrating a third embodiment of a user interface provision method for controlling the screen of an image display device of the present invention.

Figure 29:
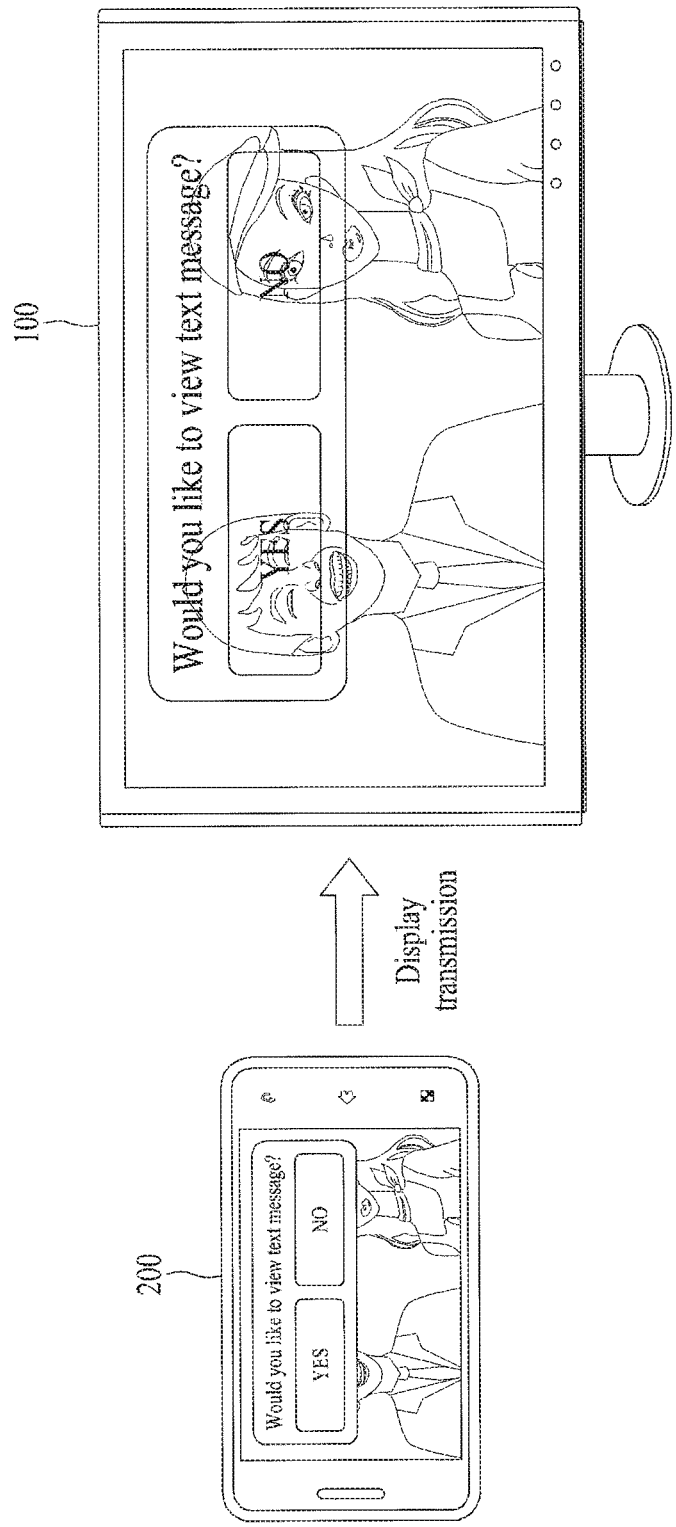
FIGS. 29 to 33 are diagrams illustrating a third embodiment of a user interface provision method for controlling the screen of an image display device of the present invention.

FIG. 29 shows a user interface environment according to the third embodiment of the user interface provision method for controlling the screen of the image display device 100 of the present invention.

The mobile terminal 200 transmits the screen information of the mobile terminal 200 to the image display device 100 through data communication. The image display device 100 outputs the screen information of the mobile terminal 200 to the user.

That is, the image display device 100 receives and outputs the screen information of the mobile terminal 100, such that the image display device 100 and the mobile terminal 200 output the same screen. Thus, the user may receive the screen of the mobile terminal 200 from the mobile terminal 200 and the image display device 100.

In FIG. 29, a text message screen is output on the screen of the mobile device 200 while a moving image is executed. The screen of the mobile terminal 200 is transmitted to the image display device 100 and is equally output on the image display device 100.

Although the screen of the mobile terminal 200 and the screen of the image display device 100 are equally output in FIG. 29, different screens may be output according to circumstances. The mobile terminal 200 determines whether the screen information is being transmitted to the image display device 100, that is, whether a mirroring service is being provided, converts the screen information of the mobile terminal 200 into a format suiting the connected image display device 100 if the mirroring service is being provided, and transmits the converted screen information.

For example, as shown in FIG. 29, if a text message is received while a moving image is executed, the mobile terminal 200 may output the content of the text message on the screen of the mobile terminal 200. However, as shown in FIG. 29, a message confirmation screen may be transmitted to the image display device 100.

Figure 30:
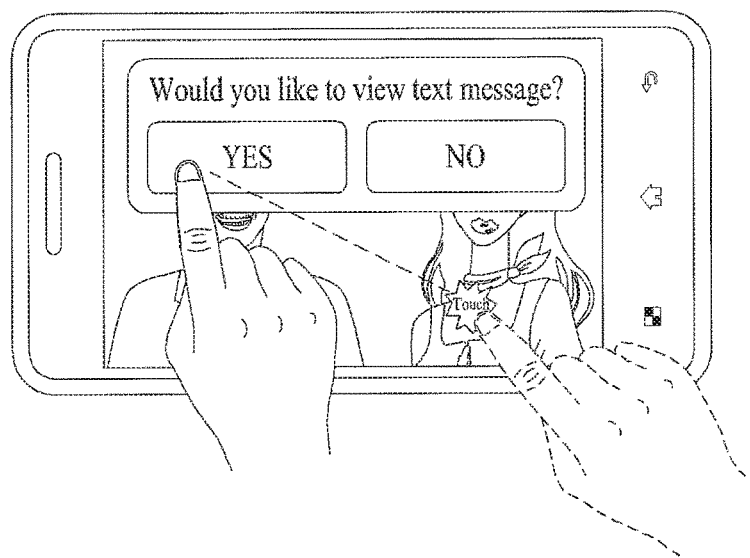
Figure 31:
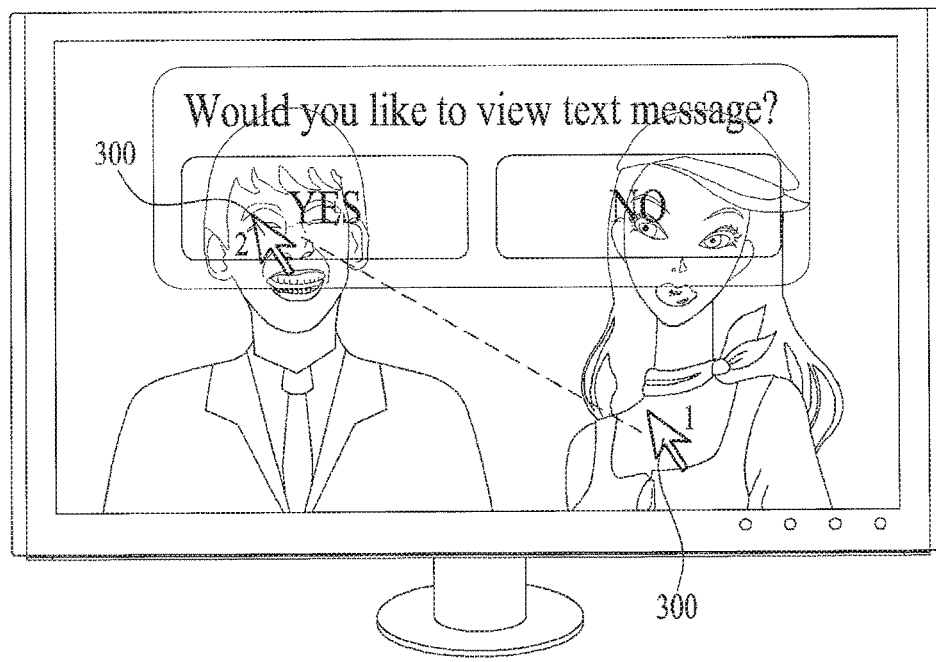

FIG. 30 shows the user inputting a first user touch to the mobile terminal 200 and FIG. 31 shows the screen of the image display device 100 if the first user touch is input to the mobile terminal 200.

In FIG. 30, the user inputs the first user touch in one right lower region of the mobile terminal 200. Then, the user drags the first user touch to a "YES" menu region. That is, the user inputs a touch of weak pressure in one right lower region of the mobile terminal 200 and then drags the touch to the "YES" menu region.

In this case, the controller 280 of the mobile terminal 200 controls the output unit 250 to output the guide image 156 in the screen region in which the first user touch is input. As shown in FIG. 30, if the user inputs the first user touch in one region of the screen, the controller 280 outputs the pointer in the screen region in which the first user touch is input.

As shown in FIG. 30, if the user inputs a first user touch in one right lower region of the mobile terminal 200 and then drags the first user touch to the "YES" menu region, the controller 280 outputs the guide image 156 along the region in which the first user touch is input.

Then, the controller 280 captures a current screen of the mobile terminal 200, generates screen information of the mobile terminal 200, and transmits the generated screen information to the image display device 100 via the external device communication unit 271. The transmitted screen information of the mobile terminal 200 is information about the screen which the guide image according to the first user touch is further displayed.

The image display device 100 outputs the screen information of the mobile terminal 200 via the display 170.

FIG. 31 shows the output of the screen information of the mobile terminal transmitted to the image display device 100, in which the guide image 156 according to the first user touch is further displayed. That is, the pointer which is the guide image 156 is output while moving from the right lower region, in which the first user touch is input, of the screen to the "YES" menu region.

Figure 32:
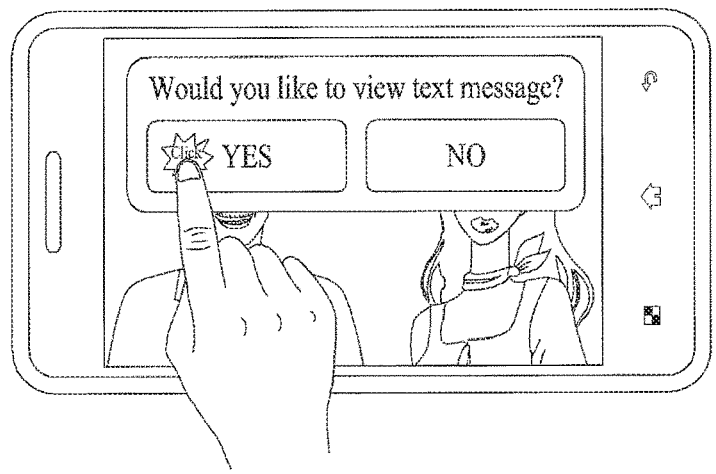
Figure 33:

FIG. 32 shows the user inputting the second user touch to the mobile terminal 200 and FIG. 33 shows the screen of the image display device 100 if the second user touch is input to the mobile terminal 200.

In FIG. 32, the user inputs the second user touch in the "YES" menu region of the mobile terminal 200. That is, the user inputs a touch of strong pressure in the "YES" menu region.

At this time, the controller 280 of the mobile terminal 200 executes the user command corresponding to the second user touch. That is, the controller 280 may analyze the user command corresponding to the second user touch and control the mobile terminal 200 according to the user command.

Accordingly, the controller 280 executes the "YES" menu according to the user command corresponding to the second user touch. The controller 280 captures a current screen of the mobile terminal 200, generates screen information of the mobile terminal 200, and transmits the generated screen information to the image display device 100 via the external device communication unit 271. The transmitted screen information is information about the screen on which the "YES" menu of the moving image is executed.

The image display device 100 outputs the screen information of the mobile terminal 200 on the display 170.

FIG. 33 shows the output of the screen information of the mobile terminal 200 transmitted to the image display device 100, in which the "YES" menu is executed. That is, as the information about the screen on which the "YES" menu is executed according to the second user touch, a text message is output.

In the first to third embodiments, the user touch is used in order to control the screen information of the mobile terminal 200 output via the image display device 100. That is, the user inputs the touch to the mobile terminal 200 to control the screen output via the mobile terminal 200 and the image display device 100.

The present invention can provide a user interface for controlling the screen information of the mobile terminal 200 output via the image display device 100 using various input means in addition to the user touch, which will now be described.

Figure 34:
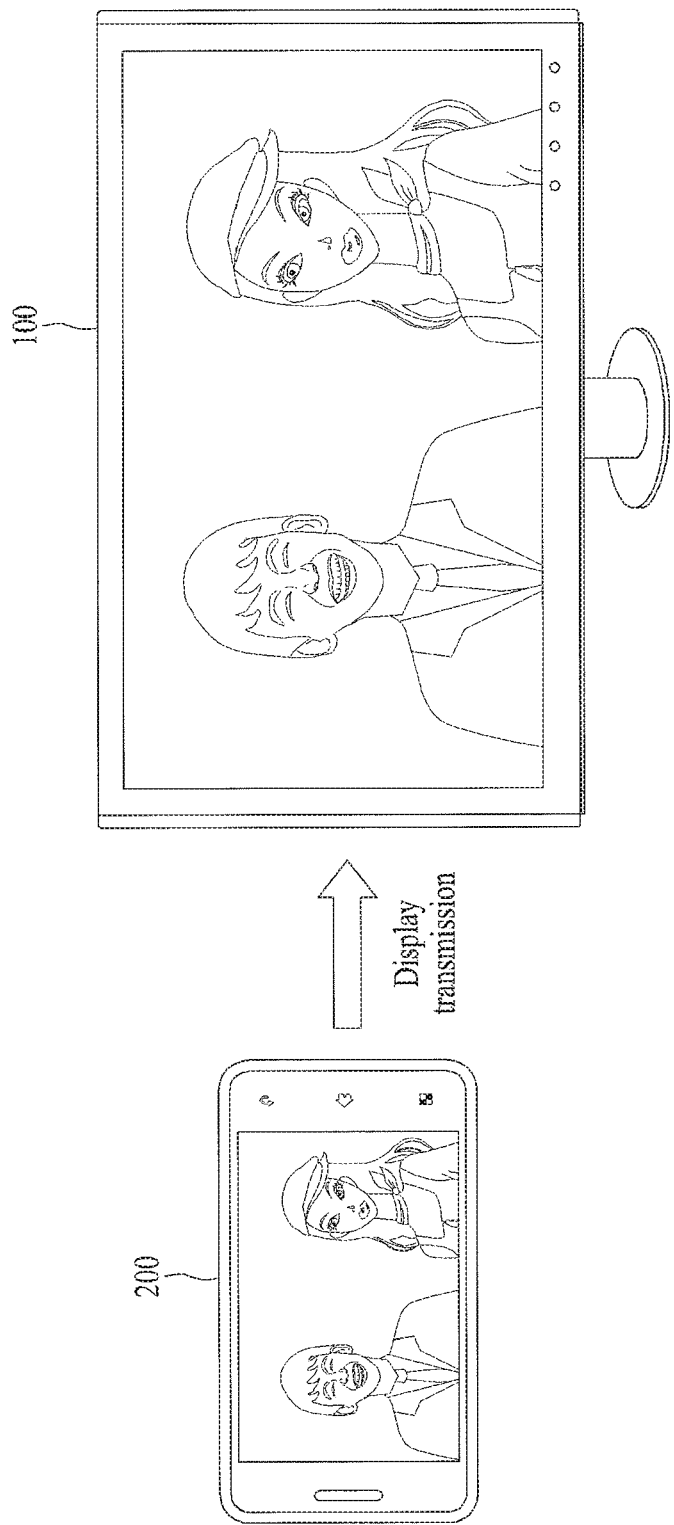
FIG. 34 is a diagram showing a user interface environment illustrating fourth to sixth embodiments of a user interface provision method for controlling the screen of an image display device of the present invention.

FIG. 34 is a diagram showing a user interface environment illustrating fourth to sixth embodiments of a user interface provision method for controlling the screen of an image display device 100 of the present invention.

The mobile terminal 200 transmits the screen information of the mobile terminal 200 to the image display device 100 through data communication. The image display device 100 outputs the screen information of the mobile terminal 200 to the user.

That is, the image display device 100 receives and outputs the screen information of the mobile terminal 200, such that the image display device 100 and the mobile terminal 200 output the same screen. Thus, the user may receive the screen of the mobile terminal 200 via the mobile terminal 200 and the image display device 100.

In FIG. 34, the moving-image screen which is the screen of the mobile terminal 200 is transmitted to the image display device 100 and is equally output on the image display device 100.

FIG. 35 shows the fourth embodiment of the user interface provision method for controlling the screen of the image display device 100 of the present invention. In FIG. 35, the user inputs voice "menu" to the user input unit 272 of the mobile terminal 200.

If the user voice is input to the mobile terminal 200, the controller 280 of the mobile terminal 200 executes the user command corresponding to the user voice. That is, the controller 280 analyzes the user command corresponding to the input user voice and controls the mobile terminal 200 according to the user command.

As shown in FIG. 35, if the user voice "menu" is input to the mobile terminal 200, the controller 280 may recognize the user voice "menu" as the user command for executing moving-image navigation. The controller 280 executes the user command corresponding to the user voice. The controller 280 controls the output unit 250 to output a moving-image navigation screen.

If the user command corresponding to the user voice is executed, the controller 280 enters a voice recognition mode and waits for user voice recognition. For example, as shown in FIG. 35, if moving-image navigation is executed according to the user voice "menu", the controller may enter the voice recognition mode in order to recognize the user voice for controlling the navigation. This allows the user to continuously voice-control the mobile terminal 200. The controller 280 may output the screen corresponding to the voice standby mode through the output unit 250 in order to notify the user of entrance into the voice standby mode.

The controller 280 may previously set a voice command set subjected to voice recognition after entering the voice standby mode. For example, if moving-image navigation is performed, the controller 280 may previously set a voice command set of "rewind", "fast forward", "play" and "stop" corresponding to moving-image navigation functions. In addition, if an Internet browser is executed, the controller 280 may previously set a voice command set of "selection", "click" and "back" corresponding to the functions of the Internet browser, such that the controller 280 recognizes only predetermined voice commands.

The controller 280 captures a current screen of the mobile terminal 200, generates screen information of the mobile terminal 200, and transmits the generated screen information to the image display device 100 via the external device communication unit 271. The transmitted screen information of the mobile terminal 200 is information about the screen on which the moving-image navigation executed according to the voice command of the user is further displayed. The image display device 100 outputs the screen information of the mobile terminal 200 via the display 170.

Figure 36:
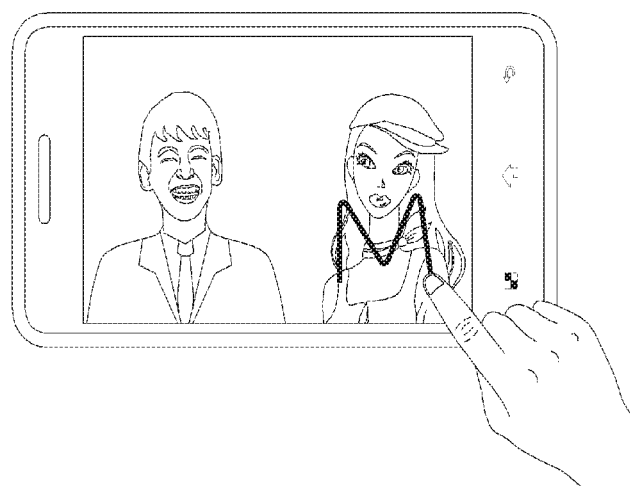
FIG. 36 is a diagram illustrating a fifth embodiment of a user interface provision method for controlling the screen of an image display device of the present invention.

FIG. 36 shows a fifth embodiment of a user interface provision method for controlling the screen of an image display device 100 of the present invention.

In FIG. 36, the user inputs a predetermined gesture to the user input unit 272 of the mobile terminal 200. Although FIG. 36 shows the case in which the user inputs a gesture using a touch, the user may input a gesture using motion via the camera 221.

If the user gesture is input to the mobile terminal 200, the controller 280 of the mobile terminal 200 executes the user command corresponding to the user gesture. That is, the controller 280 analyzes the user command corresponding to the input user gesture and controls the mobile terminal 200 according to the user command.

As shown in FIG. 36, if an "M" gesture is input to the mobile terminal 200, the controller 280 may recognize the "M" gesture as the user command for executing moving-image navigation. The controller 280 executes the user command corresponding to the user gesture. The controller 280 controls the output 250 to output the moving-image navigation screen.

The controller 280 captures a current screen of the mobile terminal 200, generates screen information of the mobile terminal 200, and transmits the generated screen information to the image display device 100 via the external device communication unit 271. The transmitted screen information of the mobile terminal 200 is information about the screen on which the moving-image navigation executed according to the voice command of the user is further displayed. The image display device 100 outputs the screen image of the mobile terminal 200 via the display 170.

Figure 37:
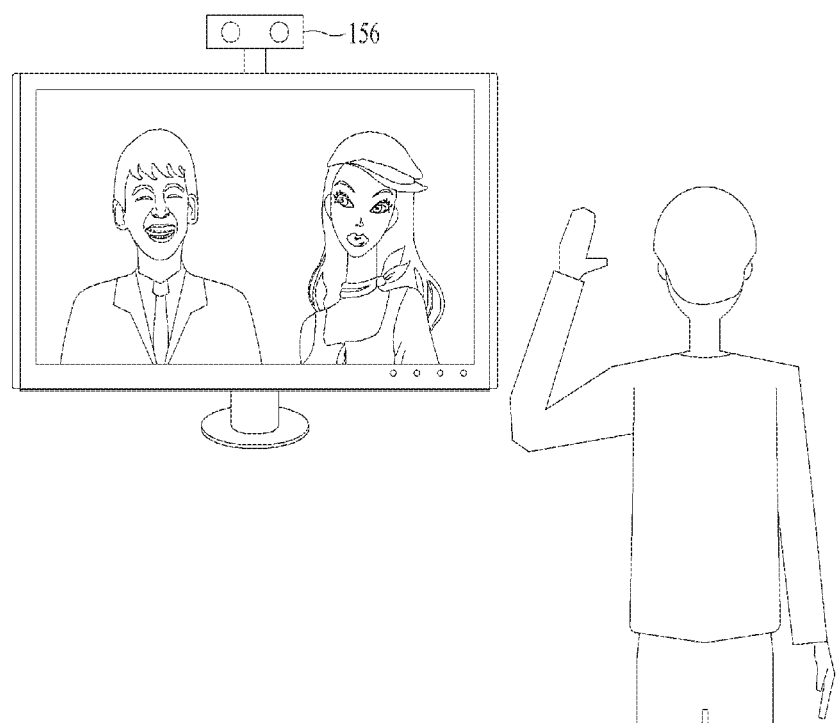
FIG. 37 is a diagram illustrating a sixth embodiment of a user interface provision method for controlling the screen of an image display device of the present invention.

FIG. 37 is a diagram showing a sixth embodiment of a user interface provision method for controlling the screen of an image display device 100 of the present invention.

In FIG. 37, the user inputs a predetermined gesture to the image display device 100 via the user input unit 155.

If the user gesture is input to the image display device 100, the controller 180 of the image display device 100 analyzes the user command corresponding to the input user gesture and generates user command data. The controller 180 transmits the generated user command data to the mobile terminal 200 via the interface 150.

The controller 280 of the mobile terminal 200 controls the mobile terminal 200 according to the received user command data.

As shown in FIG. 37, if a gesture of putting one hand up is input to the image display device 100, the controller 180 of the image display device 100 may recognize the gesture as a user command for executing moving-image navigation. The controller 180 generates and transmits user command data corresponding to the user gesture to the mobile terminal 200.

The controller 280 of the mobile terminal 200 may control the output unit 250 according to the received user command data to output the moving-image navigation screen.

The controller 280 captures a current screen of the mobile terminal 200, generates screen information of the mobile terminal 200, and transmits the generated screen information to the image display device 100 via the external device communication unit 271. The transmitted screen information of the mobile terminal 200 is information about the screen on which the moving-image navigation executed according to the gesture command of the user is further displayed. The image display device 100 outputs the screen image of the mobile terminal 200 via the display 170.

According to the above-described user interface, the present invention can provide various input means for controlling the screen of the image display device 100. Accordingly, the user can easily control the screen shared between the mobile terminal 200 and the image display device 100.

FIG. 38 is a diagram showing a seventh embodiment of a user interface provision method for controlling the screen of an image display device 100 of the present invention.

As described above, the mobile terminal 200 and the image display device 100 output the same screen to the user. Accordingly, the screen of the mobile terminal 200 and the screen of the image display device 100, which are viewed by the user, should be the same.

However, the user views the screen of the image display device 100 in a fixed direction, but views the screen of the mobile terminal 200 in a direction which may vary according to use form.

As shown in FIG. 38, although the user views the screen of the image display device 100 in the landscape mode, the user may view the screen of the mobile terminal 200 in the portrait mode or the landscape mode.

That is, if the mobile terminal 200 is in the landscape mode, the user views the screen of the mobile terminal 200 in the landscape mode and, if the mobile terminal 200 is in the portrait mode, the user views the screen of the mobile terminal 200 in the portrait mode.

Accordingly, the present invention provides the following user interface in order to equally provide the screen of the mobile terminal 200 and the screen of the image display device 100 to the user.

Figure 38A:
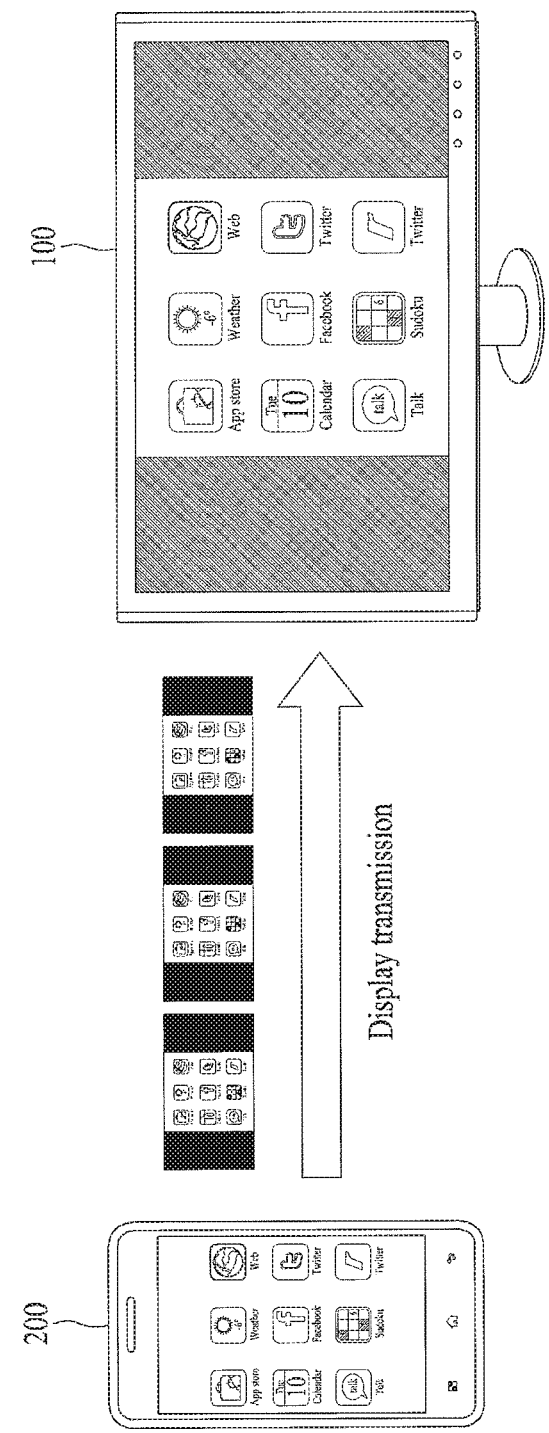
FIGS. 38A and 38B are diagrams illustrating a seventh embodiment of a user interface provision method for controlling the screen of an image display device of the present invention.

FIG. 38A shows the mobile terminal 200 in the portrait mode. In this instance, the controller 280 of the mobile terminal 200 sets right and left margins in the screen information and transmits the screen information with right and left margins to the image display device 100.

As shown in FIG. 38, the controller 280 of the mobile terminal 200 may process the right and left margins of the screen information in black and white such that the screen of the portrait mode suits the screen of the image display device 100 of the landscape mode, and transmit the screen information to the image display device 100.

The image display device 100 outputs the screen information of the mobile terminal 200 with right and left margins via the display 170.

Figure 38B:
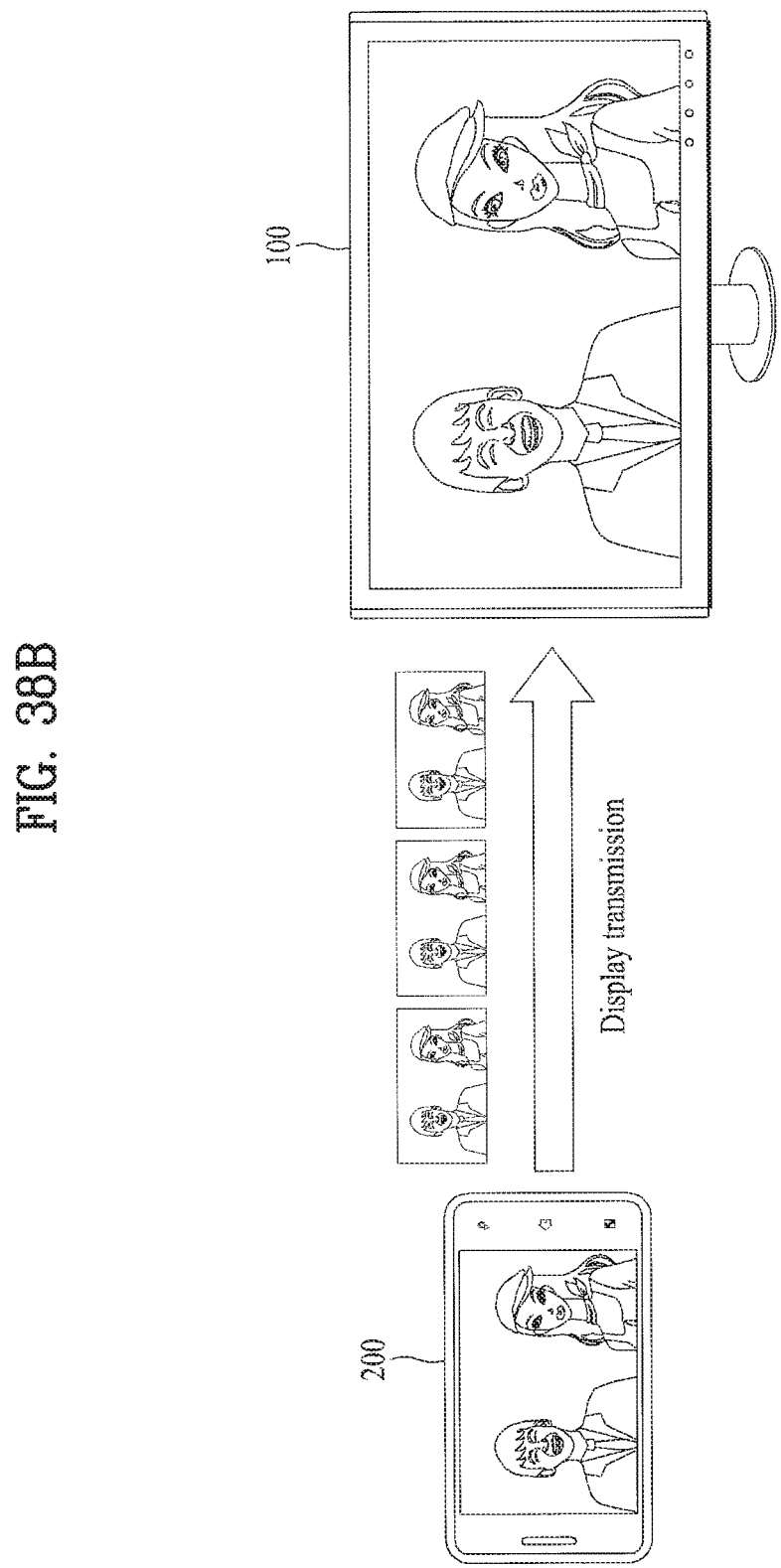

FIG. 38B shows the mobile terminal 200 in the landscape mode. The controller 280 of the mobile terminal 200 transmits the screen information to the image display device 100 without change, because the screen of the mobile terminal and the screen of the image display device 100 are located in the same direction. The image display device 100 outputs the screen information of the mobile terminal 200 via the display 170.

If the image display device 100 is in the portrait mode and the mobile terminal 200 is in the landscape mode, the controller 280 of the mobile terminal 200 may process upper and lower margins of the screen information in black and white, and transmit the screen information with upper and lower margins to the image display device 100.

In the present invention, the margins may be processed using various methods in addition to a black and white processing method. For example, the controller 280 of the mobile terminal 200 may automatically change the screen information of the mobile terminal 200 into a portrait or landscape mode and may set the margins. The controller 280 may automatically change the screen information of the mobile terminal 200 to the screen posture direction of the image display device 100 so as to remove the margins.

The controller 280 may output a hidden screen of the mobile terminal 200 in the margins to fill the margins. That is, the controller 280 may output the screen for displaying functions which are executed but are not output, such as a widget, a clock, a message, etc. of a wallpaper in the margins.

That is, the controller 280 of the mobile terminal 200 may compare the screen posture directions of the image display device 100 and the mobile terminal 200 and determine whether margins are set in the screen information.

The controller 280 of the mobile terminal 200 may measure the screen posture direction of the mobile terminal 200 using a gyroscope sensor, etc. The controller 180 of the image display device 100 may measure the screen posture direction of the image display device 100 using a gyroscope sensor, etc. The mobile terminal 200 and the image display device 100 may share the screen information of the mobile terminal 200 and the image display device 100 through data communication.

At this time, the controller 280 of the mobile terminal 200 sets margins in the screen information of the mobile terminal 200 and transmits the screen information with the margins to the image display device 100 if the screen posture direction of the mobile terminal 200 and the screen posture direction of the image display device 100 are different.

According to the present invention, it is possible to efficiently determine a target mobile terminal to be controlled by a user using location information of screens output on an image display device and location information of a cursor. In addition, if the user changes the target mobile terminal, the image display device can rapidly establish data communication with the changed target mobile terminal.

In control of the screens output on the image display device using the mobile terminals, the user may manipulate the mobile terminals in a state of fixing their eyes on the image display device, thereby increasing user convenience. That is, it is possible to solve inconvenience that the user should manipulate the mobile terminals while alternately viewing the mobile terminal and the image display device.

It is possible to provide various input means for controlling the screens output on the image display device and allow the user to easily control the screens shared between the mobile terminals and the image display device.

In addition, in display of a guide image corresponding to a user command on the screen, a complicated protocol for calculating the input location of the user command does not need to be mounted between devices and thus complexity of a user interface can be significantly reduced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a system including a first display capable of being located in multiple directions and a second display, the method comprising:
   performing wireless communication between the first display and the second display;
   transmitting, by the first display, information for a screen posture direction of the first display to the second display through the wireless communication;
   capturing, by the second display, a current image output by the second display;
   generating, by the second display, first screen information or second screen information;
   transmitting, by the second display, the first screen information to the first display through the wireless communication when the screen posture direction of the first display is different from a screen posture direction of the second display;
   transmitting, by the second display, the second screen information to the first display through the wireless communication when the screen posture direction of the first display is same as the screen posture direction of the second display, wherein the first screen information is different from the second screen information; and displaying, by the first display, a mirroring image generated based on the first or second screen information.

2. The method of claim 1, further comprising:
measuring, by the first display, the screen posture direction of the first display using at least one sensor.

3. The method of claim 1, wherein the second screen information is also transmitted from the second display to the first display through the wireless communication when a screen of the second display and a screen of the first display are located in a same direction.

4. The method of claim 1, wherein the first screen information includes the current image captured by the second display and margin information while the second screen information includes the current image captured by the second display without the margin information.

5. The method of claim 4, wherein the displaying the mirroring image further comprises:
displaying, in the first display, the mirroring image with a black margin when the screen posture direction of the first display is different from the screen posture direction of the second display; and
displaying, in the first display, the mirroring image without the black margin when the screen posture direction of the first display is same as the screen posture direction of the second display.

6. The method of claim 5, wherein the margin information corresponds to right and left margins when the second display is in a portrait mode and the first display is in a landscape mode, further the margin information corresponds to upper and lower margins when the second display is in the landscape mode and the first display is in the portrait mode.

7. The method of claim 1, wherein the wireless communication is based on Bluetooth, ZigBee or Wi-Fi.

8. The method of claim 1, wherein the screen posture direction of the first display or the second display corresponds to a landscape mode or a portrait mode.

9. A method for controlling an image display device, the method comprising:
performing wireless communication with a mobile terminal;
transmitting information for a screen posture direction of the image display device to the mobile terminal through the wireless communication;
receiving first screen information through the wireless communication from the mobile terminal when the screen posture direction of the image display device is different from a screen posture direction of the mobile terminal;
receiving second screen information through the wireless communication from the mobile terminal when the screen posture direction of the image display device is same as the screen posture direction of the mobile terminal, wherein the first screen information is different from the second screen information; and
displaying a mirroring image related to a current image captured by the mobile terminal based on the first or second screen information.

10. The method of claim 9, further comprising:
measuring, by the image display device, the screen posture direction of the image display device using at least one sensor.

11. The method of claim 9, wherein the second screen information is also transmitted from the mobile terminal to the image display device through the wireless communication when a screen of the mobile terminal and a screen of the image display device are located in a same direction.

12. The method of claim 9, wherein the first screen information includes the current image captured by the mobile terminal and margin information while the second screen information includes the current image captured by the mobile terminal without the margin information.

13. The method of claim 12, wherein the displaying the mirroring image further comprises:
displaying the mirroring image with a black margin when the screen posture direction of the image display device is different from the screen posture direction of the mobile terminal; and
displaying the mirroring image without the black margin when the screen posture direction of the image display device is same as the screen posture direction of the mobile terminal.

14. The method of claim 12, wherein the margin information corresponds to right and left margins when the mobile terminal is in a portrait mode and the image display device is in a landscape mode, further the margin information corresponds to upper and lower margins when the mobile terminal is in the landscape mode and the image display device is in the portrait mode.

15. The method of claim 9, wherein the wireless communication is based on Bluetooth, ZigBee or Wi-Fi.

16. The method of claim 9, wherein the screen posture direction of the image display device or the mobile terminal corresponds to a landscape mode or a portrait mode.

17. An image display device, comprising:
a display module;
a wireless interface configured to perform wireless communication with a mobile terminal; and
a controller configured to control the wireless interface to:
transmit information for a screen posture direction of the image display device to the mobile terminal through the wireless communication,
receive first screen information through the wireless communication from the mobile terminal when the screen posture direction of the image display device is different from a screen posture direction of the mobile terminal,
receive second screen information through the wireless communication from the mobile terminal when the screen posture direction of the image display device is same as the screen posture direction of the mobile terminal,
wherein the first screen information is different from the second screen information,
wherein the first screen information includes a first image and margin information,
wherein the second screen information includes a second image without the margin information, further the first and second images relate to a current image displayed on the mobile terminal, and
wherein the controller is further configured to control the display module to display a mirroring image generated based on the first screen information or the second screen information.

18. The image display device of claim 17, further comprising:
at least one sensor configured to measure the screen posture direction of the image display device.

19. The image display device of claim 17, wherein the second screen information is also transmitted from the mobile terminal to the image display device through the wireless communication when a screen of the mobile terminal and a screen of the image display device are located in a same direction.

20. The image display device of claim 17, wherein the display module is configured to:
- display the first image with a black margin when the screen posture direction of the image display device is different from the screen posture direction of the mobile terminal; and
- display the second image without the black margin when the screen posture direction of the image display device is same as the screen posture direction of the mobile terminal.

21. The image display device of claim 17, wherein the margin information corresponds to right and left margins when the mobile terminal is in a portrait mode and the image display device is in a landscape mode, further the margin information corresponds to upper and lower margins when the mobile terminal is in the landscape mode and the image display device is in the portrait mode.

22. The image display device of claim 17, wherein the wireless communication performs based on Bluetooth, Zig-Bee or Wi-Fi.

23. The image display device of claim 17, wherein the screen posture direction of the image display device or the mobile terminal corresponds to a landscape mode or a portrait mode.

* * * * *